(12) United States Patent
Taquet et al.

(10) Patent No.: US 12,200,214 B2
(45) Date of Patent: *Jan. 14, 2025

(54) METHOD AND APPARATUS FOR ENCODING OR DECODING VIDEO DATA WITH FRAME PORTIONS

(71) Applicant: CANON KABUSHIKI KAISHA, Tokyo (JP)

(72) Inventors: Jonathan Taquet, Talensac (FR); Naël Ouedraogo, Maure de Bretagne (FR); Franck Denoual, Saint Domineuc (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,696

(22) Filed: Nov. 29, 2023

(65) Prior Publication Data

US 2024/0107020 A1  Mar. 28, 2024

Related U.S. Application Data

(63) Continuation of application No. 17/045,962, filed as application No. PCT/EP2019/057432 on Mar. 25, 2019, now Pat. No. 11,876,962.

(30) Foreign Application Priority Data

Apr. 9, 2018  (GB) ..................... 1805886

(51) Int. Cl.
*H04N 19/119* (2014.01)
*H04N 19/169* (2014.01)
*H04N 19/174* (2014.01)
*H04N 19/46* (2014.01)

(52) U.S. Cl.
CPC ......... *H04N 19/119* (2014.11); *H04N 19/174* (2014.11); *H04N 19/188* (2014.11); *H04N 19/46* (2014.11)

(58) Field of Classification Search
None
See application file for complete search history.

(56) References Cited

U.S. PATENT DOCUMENTS

| 2013/0101035 A1* | 4/2013 | Wang | H04N 19/174 375/E7.243 |
| 2014/0295372 A1* | 10/2014 | Haenggi | A61C 19/04 433/215 |
| 2015/0016503 A1* | 1/2015 | Rapaka | H04N 19/436 375/240.02 |

(Continued)

*Primary Examiner* — Kaitlin A Retallick
(74) *Attorney, Agent, or Firm* — Canon U.S.A., Inc. IP Division

(57) ABSTRACT

The present invention concerns a method of encoding video data comprising frames into a bitstream, frames being spatially divided into frame portions, the method comprising:
encoding at least one frame portion into one or more first encoded units;
wherein the method further comprises:
signalling into said first encoded units, at least one frame portion identifier, a frame portion identifier identifying one encoded frame portion; and
providing frame portion arrangement information comprising the frame portion identifier and spatial information about the frame portion.

6 Claims, 21 Drawing Sheets

(56) References Cited

U.S. PATENT DOCUMENTS

| | | | |
|---|---|---|---|
| 2016/0057441 A1* | 2/2016 | Skupin | H04N 19/17 |
| | | | 375/240.25 |
| 2019/0166376 A1* | 5/2019 | Thomas | H04N 19/46 |
| 2019/0238849 A1* | 8/2019 | Fang | H04N 19/124 |
| 2021/0136407 A1* | 5/2021 | Aono | H04N 19/55 |

* cited by examiner

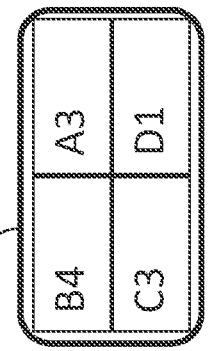
Fig. 8b
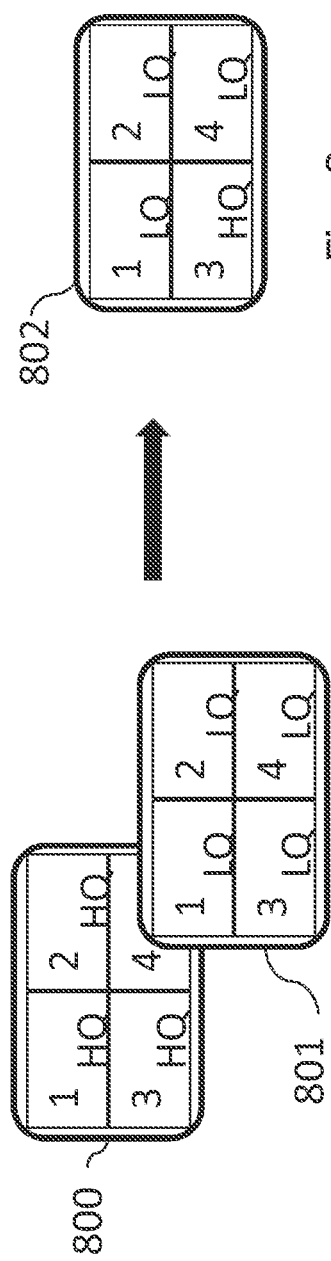
Fig. 8a
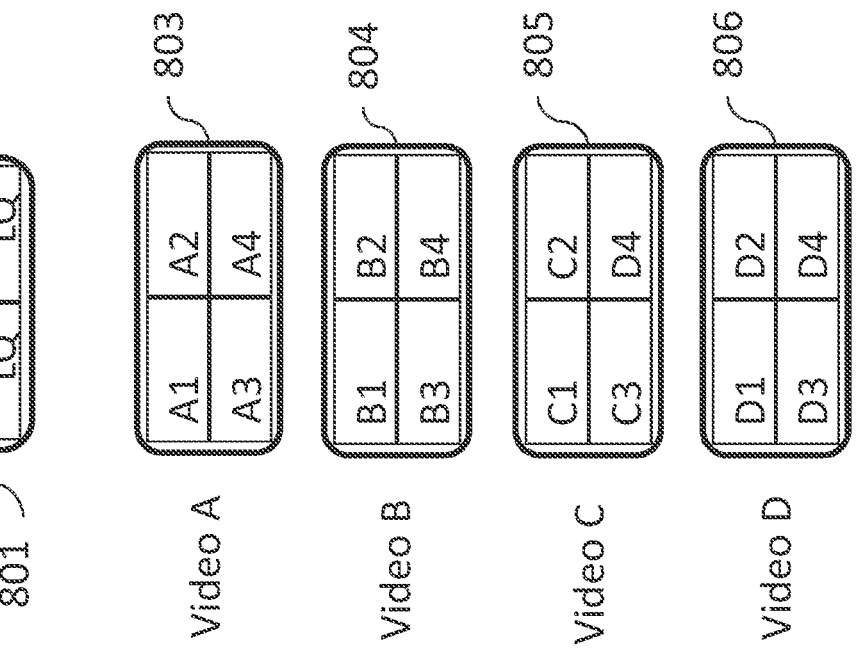

| Tiling_parameter_set( ) { | Descriptor |
|---|---|
| ... | |
| num_ctiles | u(v) |
| for (i=0;i<num_ctiles;i++) { | |
| ctile_ref_uid[i] | u(8) |
| tile_ctb_addr[i] | u(v) |
| slice_pic_parameter_set_id[i] | ue(v) |
| ... | |
| } | |

1310 — Tiling_parameter_set( ) {
1311 — num_ctiles
1312 — ctile_ref_uid[i]
1313 — tile_ctb_addr[i]
1314 — slice_pic_parameter_set_id[i]

Fig. 13b

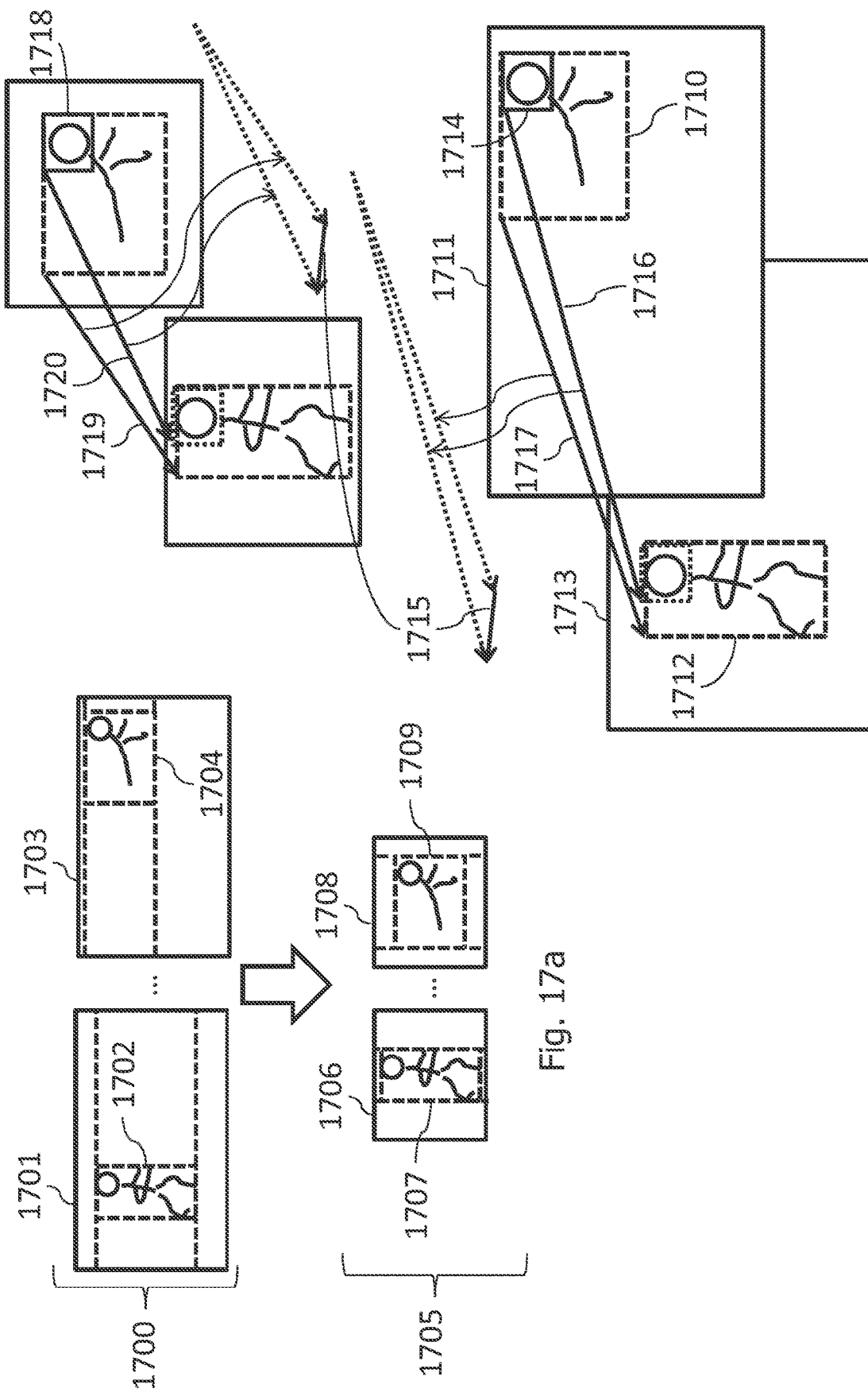

//www.google.com/url?sa=t&source=web&rct=j">
METHOD AND APPARATUS FOR ENCODING OR DECODING VIDEO DATA WITH FRAME PORTIONS

CROSS-REFERENCE TO RELATED APPLICATIONS

This application is a continuation of U.S. patent application Ser. No. 17/045,962, filed on Oct. 7, 2020, which is the National Phase application of PCT Application No. PCT/EP2019/057432, filed on Mar. 25, 2019 and titled "METHOD AND APPARATUS FOR ENCODING OR DECODING VIDEO DATA WITH FRAME PORTIONS". This application claims the benefit under 35 U.S.C. § 119 (a)-(d) of United Kingdom Patent Application No. 1805886.7, filed on Apr. 9, 2018. The above cited patent applications are hereby incorporated by reference herein in their entireties.

FIELD OF THE INVENTION

The present disclosure concerns a method and a device for encoding or decoding video data comprising spatial portions.

BACKGROUND OF THE INVENTION

Description of the Related Art

HEVC tiles where introduced and designed for parallel encoding. However, with high size video content, there are several use cases where tiles are used differently. In particular, a need for streaming individual tiles or set of tiles has been developed. Some application have also developed a need for the combination of different tiles, from a same sequence or from different sequences, to compose a new video sequence.

Current mechanisms in HEVC have not been designed with this kind of scenarios in mind. Implementing these scenarios with current HEVC mechanism implies to add encoding constraints on tiles and arbitrary composition of tiles at decoding involves rewriting processes of the data. In particular, rewriting of the data including manipulation of slice segment headers are generally required.

SUMMARY OF THE INVENTION

The present invention has been devised to address one or more of the foregoing concerns. It concerns the definition of frame portions and the signalling of these frame portions in the bitstream. The invention aims at facilitating the extraction and the recombination of these frame portions at decoding while limiting the required rewriting processes when doing so.

According to a first aspect of the invention there is provided a method of encoding video data comprising frames into a bitstream, frames being spatially divided into frame portions, the method comprising:
  encoding at least one frame portion into one or more first encoded units;
  wherein the method further comprises:
  signalling into said first encoded units, at least one frame portion identifier, a frame portion identifier identifying one encoded frame portion; and
  providing frame portion arrangement information comprising the frame portion identifier and spatial information about the frame portion.

The first aspect of the invention has the advantage of providing more flexibility and simpler manipulations, while enabling the possibility to improve the compression compared to known tiling design such as HEVC tiles.

In an embodiment, the frame portion arrangement information is provided into one second encoded unit.

In an embodiment, the at least one frame portion is independently encoded.

In an embodiment, the method further comprises providing a flag indicating that the frame portion has been independently encoded.

In an embodiment, the one or more first encoded units comprise a flag indicating for each frame portion that the frame portion has been independently encoded.

In an embodiment, the one or more first encoded units comprise a flag indicating that the at least one frame portion has been independently encoded.

In an embodiment, the one or more first encoded units comprise a flag indicating a level of encoding constraints used for encoding the frame portion.

In an embodiment, the frame portion is a slice and the first encoded unit is a slice unit comprising a data part, the flag being comprised in the slice segment header of the data part of the slice unit.

In an embodiment, the frame portion is a slice and the first encoded unit is a slice unit comprising a data part, the frame portion identifier being comprised in a slice segment header of the data part of the slice unit.

In an embodiment, the first encoded unit comprising a header part and a data part, which includes the encoded frame portion, said frame portion identifier being comprised in the header part.

In an embodiment, a frame portion identifier is signalled in all frame portion encoded units and a predefined frame portion identifier value indicates that the frame portion has not been independently encoded.

In an embodiment, the second encoded unit is a Parameter Set dedicated to information about one or more frames.

In an embodiment, the second encoded unit being a Parameter Set dedicated to frame portion information.

In an embodiment, a first encoded unit has a specific type indicating that the frame portion has been independently encoded.

In an embodiment, the frame portion identifier is encoded using a fixed predetermined number of bits.

In an embodiment, the frame portion identifier is encoded using a signalled number of bits.

In an embodiment, the spatial information comprises the position of the frame portion given by a coding tree unit address.

In an embodiment, the spatial information comprises the position of the frame portion given by a sample address.

In an embodiment, the spatial information comprises the size of the frame portion.

In an embodiment, the position of the frame portion is given in relation to the frame.

In an embodiment, several parameter data units are signalled in the bitstream comprising different frame portion arrangement for a same frame portion.

In an embodiment, the second encoded unit comprises a flag indicating if a given post-filtering algorithm can be used for the frame portion.

In an embodiment, a same frame portion identifier may be used to identify several frame portion defining a frame portion set.

In an embodiment, the header part comprise a layer identifier and the layer identifier is used for signalling the frame portion identifier.

According to a second aspect of the invention there is provided a method of decoding video data comprising frames from at least one bitstream, frames being spatially divided into frame portions, the method comprising:
  obtaining from the bitstream, frame portion arrangement information comprising a frame portion identifier and spatial information about the frame portion;
  extracting at least a frame portion from one or more first encoded units in the bitstream, the frame portion comprising the frame portion identifier;
  determining the position of the frame portion within the frame based on the spatial information; and
  decoding the frame portion for rendering the frame portion into a frame according to the determined position.

In an embodiment, the frame portion arrangement information is provided into one second encoded unit.

In an embodiment, the at least one frame portion is independently encoded.

In an embodiment, the method further comprises obtaining a flag indicating that the frame portion has been independently encoded.

In an embodiment, the one or more first encoded units comprise a flag indicating for each frame portion that the frame portion has been independently encoded.

In an embodiment, the one or more first encoded units comprise a flag indicating that the at least one frame portion has been independently encoded.

In an embodiment, the one or more first encoded units comprise a flag indicating a level of encoding constraints used for encoding the frame portion.

In an embodiment, the frame portion is a slice and the first encoded unit is a slice unit comprising a data part, the flag being comprised in the slice segment header of the data part of the slice unit.

In an embodiment, the frame portion is a slice and the first encoded unit is a slice unit comprising a data part, the frame portion identifier being comprised in a slice segment header of the data part of the slice unit.

In an embodiment, the first encoded unit comprising a header part and a data part, which includes the encoded frame portion, said frame portion identifier being comprised in the header part.

In an embodiment, a frame portion identifier is signalled in all frame portion encoded units and a predefined frame portion identifier value indicates that the frame portion has not been independently encoded.

In an embodiment, the second encoded unit is a Parameter Set dedicated to information about one or more frames.

In an embodiment, the second encoded unit being a Parameter Set dedicated to frame portion information.

In an embodiment, a first encoded unit has a specific type indicating that the frame portion has been independently encoded.

In an embodiment, the frame portion identifier is encoded using a fixed predetermined number of bits.

In an embodiment, the frame portion identifier is encoded using a signalled number of bits.

In an embodiment, the spatial information comprises the position of the frame portion given by a coding tree unit address.

In an embodiment, the spatial information comprises the position of the frame portion given by a sample address.

In an embodiment, the spatial information comprises the size of the frame portion.

In an embodiment, the position of the frame portion is given in relation to the frame.

In an embodiment, several parameter data units are obtained from the bitstream comprising different frame portion arrangement for a same frame portion.

In an embodiment, the second encoded unit comprises a flag indicating if a given post-filtering algorithm can be used for the frame portion.

In an embodiment, a same frame portion identifier may be used to identify several frame portion defining a frame portion set.

In an embodiment, the header part comprise a layer identifier and the layer identifier is used for signalling the frame portion identifier.

According to a third aspect of the invention there is provided a method of generating a new bitstream comprising video data comprising frames, frames being spatially divided into frame portions, the method comprising:
  determining a plurality of frame portions to be extracted from a plurality of bitstreams and merged into a new bitstream, the plurality of bitstreams being encoded;
  determining the frame portion identifiers of the frame portions to be extracted;
  generating a frame portion arrangement information for the new bitstream;
  extracting the plurality of frame portions to be extracted from the plurality of bitstreams; and
  embedding the plurality of frame portions and the generated frame portion arrangement information into the new bitstream.

In an embodiment, the method further comprises:
  determining a new frame portion identifier for an extracted frame portion; and
  replacing the frame portion identifier by the new frame portion identifier into the extracted frame portion.

In an embodiment, extracting the plurality of frame portions comprises:
  parsing the plurality of bitstreams; and
  extracting the frame portion encoded data units comprising one of the determined frame portion identifiers.

According to a fourth aspect of the invention there is provided a device for encoding video data comprising frames into a bitstream, frames being spatially divided into frame portions, the device comprising circuitry configured for:
  encoding at least one frame portion into one or more first encoded units;
  wherein the method further comprises:
  signalling into said first encoded units, at least one frame portion identifier, a frame portion identifier identifying one encoded frame portion; and
  providing frame portion arrangement information comprising the frame portion identifier and spatial information about the frame portion.

According to a fifth aspect of the invention there is provided a device for decoding video data comprising frames from at least one bitstream, frames being spatially divided into frame portions, the device comprising circuitry configured for:
  obtaining from the bitstream, frame portion arrangement information comprising a frame portion identifier and spatial information about the frame portion;
  extracting at least a frame portion from one or more first encoded units in the bitstream, the frame portion comprising the frame portion identifier;
  determining the position of the frame portion within the frame based on the spatial information; and decoding the frame portion for rendering the frame portion into a frame according to the determined position.

According to a sixth aspect of the invention there is provided a device for generating a new bitstream comprising video data comprising frames, frames being spatially divided into frame portions, the device comprising circuitry for:

determining a plurality of frame portions to be extracted from a plurality of bitstreams and merged into a new bitstream, the plurality of bitstreams being encoded;

determining the frame portion identifiers of the frame portions to be extracted;

generating a frame portion arrangement information for the new bitstream;

extracting the plurality of frame portions to be extracted from the plurality of bitstreams; and embedding the plurality of frame portions and the generated frame portion arrangement information into the new bitstream.

According to a seventh aspect of the invention there is provided a computer program product for a programmable apparatus, the computer program product comprising a sequence of instructions for implementing a method according to the invention, when loaded into and executed by the programmable apparatus.

According to an eighth aspect of the invention there is provided a computer-readable storage medium storing instructions of a computer program for implementing a method according to the invention.

According to a ninth aspect of the invention there is provided a computer program which upon execution causes the method according to the invention to be performed.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which:

BRIEF DESCRIPTION OF THE DRAWINGS

FIGS. 8a and 8b illustrate two different usage scenario examples for the combination of regions of interest;

FIGS. 13a and 13b and 13c illustrates the signalling of the frame portion arrangement performed by the encoding process;

FIGS. 17 (17a & 17b) provides an example of embodiments where a CTile may change position or size between successively encoded frames.

DESCRIPTION OF THE EMBODIMENTS

Encoding the frames of a video sequence into spatial frame portions is particularly useful, for example, in scenarios related to the streaming of so-called 360 degrees videos, which are in fact the result of the projection of a 360 degrees panoramic video or of a spherical video onto a classic 2D video representation.

360 degrees videos (or just 360 video) are videos that may have very high resolution in order to provide a good user experience. When displayed inside of a head mounted display (or on a screen), only a spatial sub-part of the 360 video content is presented to the user.

Thus, it is interesting to exploit streaming protocols like dynamic adaptive streaming over HTTP (DASH), for instance, to request spatial frame portions with high quality for the areas where the user is looking at, only. For the not seen areas (i.e. areas the user is not looking at), spatial frame portions could be simply skipped.

An application of the invention refers to streaming approaches that adapt the streaming to the viewing direction of the user. In other words, it refers to viewport dependent streaming. For such an approach, one good compromise between storage cost, computation cost, and user experience, is to encode sequences into independent spatial frame portions with various qualities. Then, the frame portions can be randomly accessed, extracted and/or combined with other frame portions sequences, according to needs and bandwidth constraints. It does not request for any additional encoding or transcoding. An example of such scenarios is described with reference to FIG. 8a.

An application concerns video surveillance system, where spatial frame portions of several different videos are reorganized in a new video to match a configuration requested from a system operator. For example, the operator may want only parts of the original video. This application in particular is illustrated in the FIG. 8*b*.

Finally, in another application, a new "video" comprising only one single spatial frame portion extracted from a full video sequence could involve a rewriting of the encoding parameters if the new position of the spatial frame portion in the new video is different.

When using HEVC, the encoding of spatial frame portions is based on the HEVC tiles. However, HEVC tiles and more generally HEVC-type tiles are not designed to address the above mentioned applications.

Figure 1:
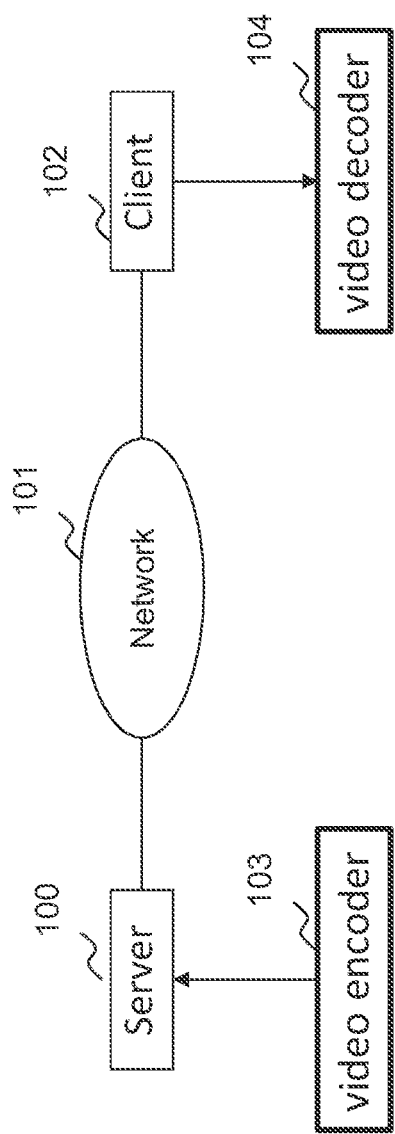
FIG. 1 illustrates a system in which the invention may be integrated.

FIG. 1 describes an embodiment of a system (for example an interactive streaming video system) in which the invention may be integrated.

A video bitstream is transmitted from a server, or a proxy server, 100 to a client 102 through a network 101. The server 100 uses video streams (or video files) generated by a video encoder 103 conforming to the specifications of a block based video codec, for example an HEVC video codec.

The encoder compresses a set of video sequences with different rate/distortions trade-off, while providing spatial random access to some spatial frame portions according to the invention, as described below.

The server 100 receives through the communication network 101, a request for a description of the available video streams for interactive streaming. The communication network 101 is based on Internet Protocol standard. The standard protocol employed to transmit the media presentation over the IP network 101 is preferably MPEG DASH: Dynamic Adaptive Streaming over HTTP. However, the invention can also be used for any other streaming protocols.

Figure 2:
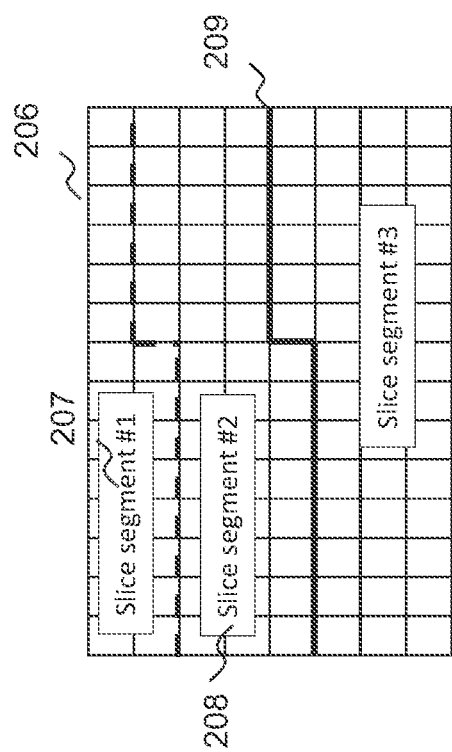
FIG. 2 illustrates the image coding structure of a block based video encoder, for example HEVC.

FIG. 2 illustrates the division of an image according to two kind of partitions: slice segments and spatial frame portions. An image 206 is divided into three slice segments. A slice segment is a part of the image or the entire image. Each slice segment contains an integer number of coding blocks (which could corresponds to coding units of HEVC). Coding blocks are made of samples.

Two kind of slice segments: independent slice segments 207 and dependent slice segments 208. Each slice segment is embedded in one NAL unit, which is a structure having a generic format for use in both packet-oriented and bitstream-oriented transport systems. The difference between the two types of slice segments resides in the fact that data specified in the independent slice segment header defines all parameters necessary to decode encoded blocks of the slice segment. On the other hand, dependent slice segment has a reduced header and relies on the first preceding independent slice segment to infer parameters not available in its header. The address of the first coding unit in the slice is specified in the independent slice segment header.

Figure 3:
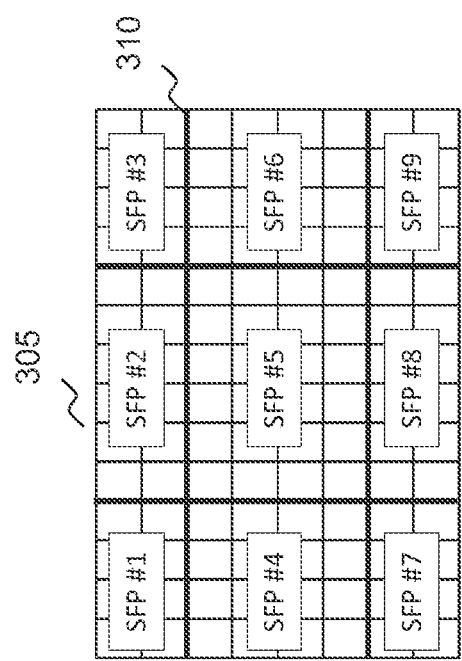
FIG. 3 illustrates the division of an image according to two kinds of partitions, called slice segments and tiles in HEVC.

FIG. 3 illustrates another partitioning into spatial frame portions (SPF) allows to split each frame in independently coded rectangular areas as depicted in the frame 305.

Like the HEVC-type tiles, a spatial frame portion contains an integer number of coding blocks. Similarly to slice boundaries, SPF boundaries 310 break all intra prediction mechanisms.

Like HEVC-type tiles, SPF are defined in a Picture Parameter Set included in specific NAL unit, which is used to initialize the decoding process. PPS NAL unit includes syntax elements that may specify the number of tile rows and the number of tile columns in the picture and their associated sizes. Other Parameter Set NAL units (e.g. Video Parameter Set or VPS, Sequence Parameter Sets or SPS) convey parameters describing the encoding configuration of the bitstream. In the invention, it is referred to any of these Parameter Set as XPS (X being used as a wildcard letter). The SPF locations, for example an offset in bits, in one slice segment are identified with syntax elements available at the end of the slice segment header.

SPF and slice segments may be jointly used but with some restrictions. One or both of the following conditions has to be verified:
   all coding blocks of one slice (or slice segment) belong to the same SPF; or
   all coding blocks of one SPF belong to the same slice (or slice segment).

It means that one slice (or slice segment) may contain several entire SPFs or be only a sub part of single tile. Second, a SPF may contain several entire slices (or slice segments) or only be a sub part of a single slice (or slice segment).

Figure 4:
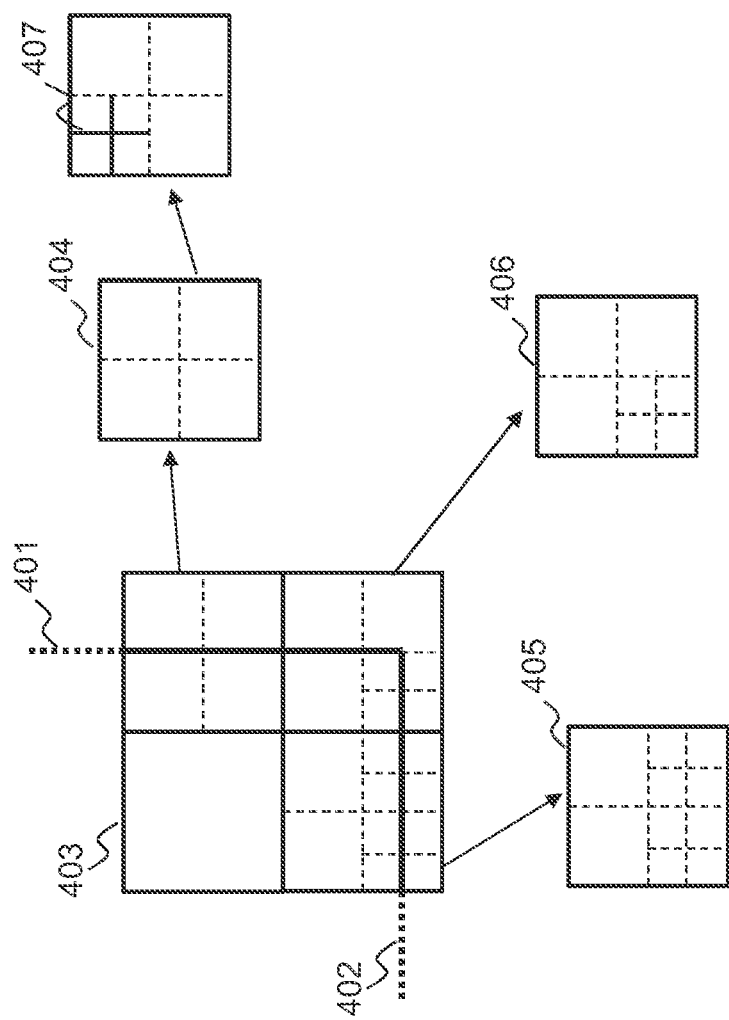
FIG. 4 illustrates the quad-tree inference mechanism used in HEVC for CTUs that are crossing the boundaries of the image.

FIG. 4 schematically illustrates the quad-tree inference mechanism used in HEVC for coding units that are crossing the boundaries of the image, for illustration purpose only. In HEVC, images are not restricted to have a width and a height multiple of the coding units size. Then, the rightmost coding units of the frame may cross the right boundary 401 of the image, and the bottom most coding units of the frame may cross the bottom boundary 402 of the image. In those cases, HEVC defines a quad-tree inference mechanism for the coding units crossing the boundaries. This mechanism consists in recursively splitting any CU of the coding unit that is crossing the image boundary, until there is no more CU crossing the boundary, or until the maximum quad-tree depth is reached for these coding units. For instance, the coding unit 403 is not automatically split, while the coding units 404, 405 and 406 are. There is no signalling of the inferred quad-tree: a decoder must infer the same quad-tree on image boundaries. However the automatically obtained quad-tree may be further refined for the coding units that are inside of the frame by signalling splitting information for that coding units (if the maximum quad-tree depth is not reached), as in 407 for instance.

Figure 6:
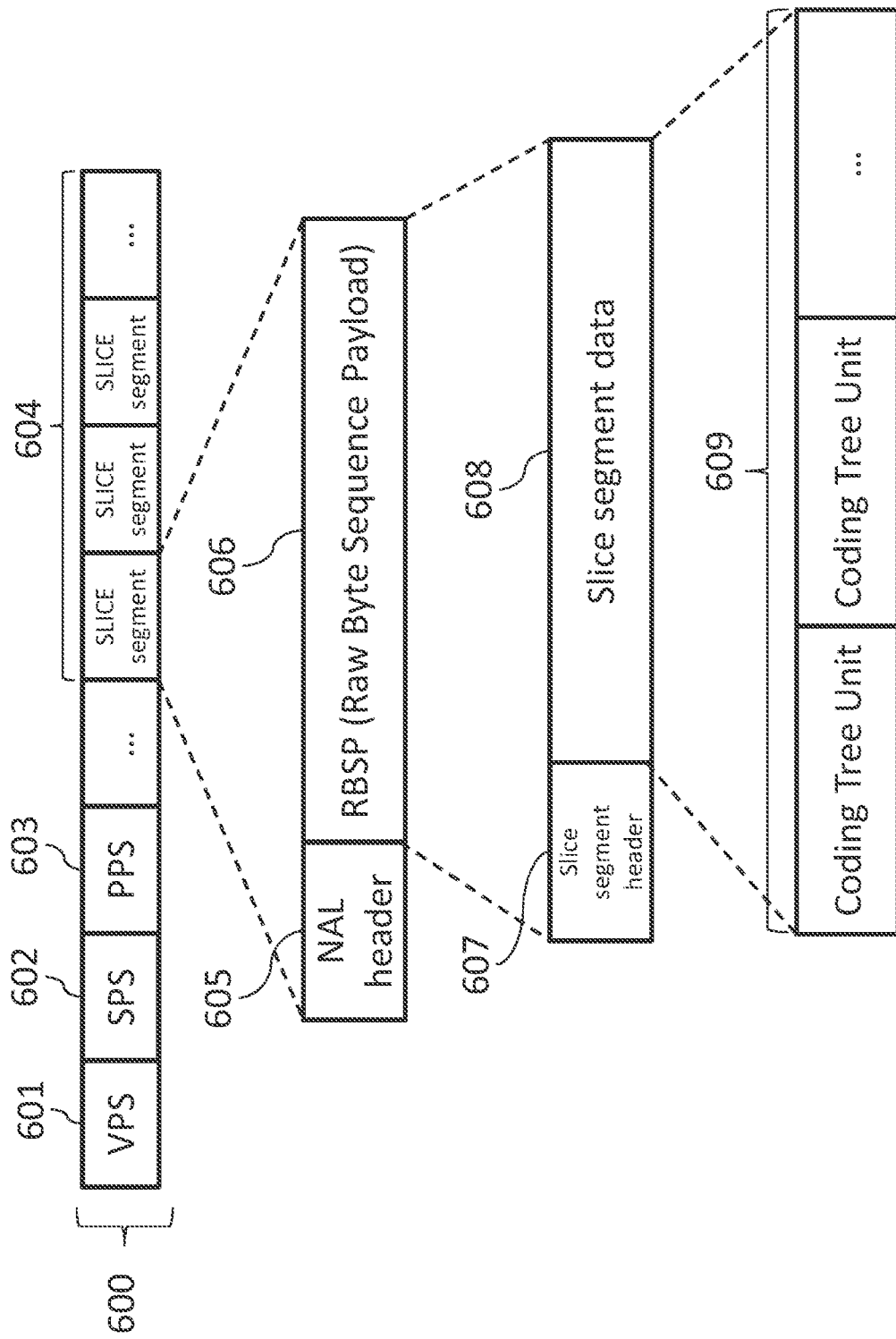
FIG. 6 illustrates an example of a HEVC bitstream organisation.

FIG. 6 illustrates typical video bitstream 600 transmitted from a server to a client. The bitstream is compliant to a HEVC or block-based bitstream.

The bitstream 600 is organized as a succession of network abstract layer (NAL) units. There are several kinds (types) of NAL units. Parameter sets NAL units (e.g. VPS, SPS and PPS for HEVC) describe the configuration of the coding tools used to encode the sequences. They also describe some information on the characteristics of the images (resolution, frame rate etc.).

A first NAL unit 601 is a video parameter set (VPS) providing information for the whole bitstream. In particular, it indicates the number of scalability layers in the bitstream.

A following NAL unit 602 is the sequence parameters set (SPS). It provides sequence level parameters. It is followed by a picture parameter set (PPS) NAL unit 603 that provides picture level parameters. Then slice segments 604 may be provided. It is common to have one slice segment per frame. The slice segments 604 may be contained into NAL units with various NAL unit types (CRA, IDR, BLA, RASL, RADL, STSA, TSA or TRAIL . . . ). A NAL unit containing a slice segment is composed of a NAL header 605 (further description of the NAL header will be provided with description of the FIG. 10) and of a raw byte sequence payload (RBSP) 606. The NAL header 605 contains information including the NAL unit type. The RBSP (i.e. the NAL unit data) contains information specific to the NAL unit type. In the case of slice segments, the RBSP contains a slice segment header 607 followed by the slice segment data 608. The slice segment data are succession of the encoded data of the raster scan ordered coding tree units 609 of the slice segment.

In an embodiment (not illustrated here), a parameter set called TPS (for tiling parameter set) may be inserted in the bitstream prior to the slice segments NAL units. The corresponding parameters are valid until a new TPS is found. A TPS describes partitioning configuration of the frames.

In another embodiment, if no TPS is present in the bitstream, it is assumed that there is only one spatial frame portion in the bitstream. Said spatial frame portion has the same dimensions than video frames and is positioned at its origin.

Figure 7:
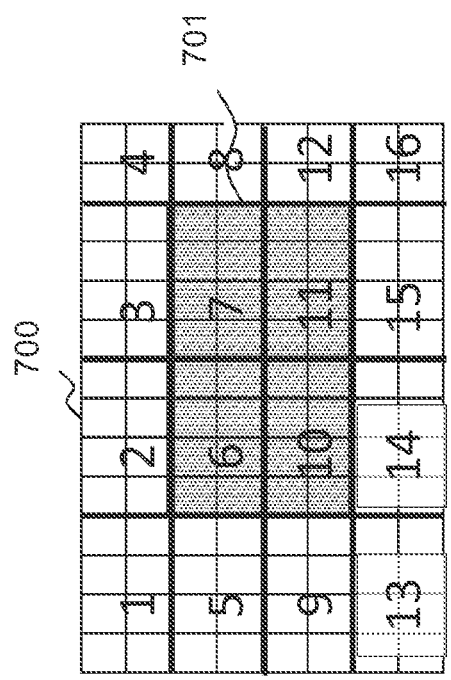
FIG. 7 illustrates an example of HEVC partitioning for region of interest (ROI) streaming.

A bitstream may contain independent frame portions or regions of interest (ROI). FIG. 7 schematically illustrates an example of a regions of interest which are here considered as rectangular areas within a frame. ROIs are well known in HEVC and block based codecs.

Streaming ROIs or independent frame portions implies a partitioning strategy. It has an impact on the coding efficiency since the introduction of tile boundaries breaks some HEVC prediction mechanisms.

In FIG. 7, a frame 700 is partitioned in a 4×4 SPF grid. To access to a predefined ROI 701, the NAL units embedding corresponding slice segments for SPF 6, 7, 10 and 11 are selected and transmitted to the client.

Preferably, in the invention one independent slice segment and zero or more dependent slice segment are embedded in the SPF. An advantage is to guaranty an access to the ROI independently to the other parts of the frame including this ROI.

Indeed, it is reminded that for HEVC and more generally block based codecs, HEVC tiles or similar break all intraframe prediction mechanisms (except loop filtering processing) at their boundaries. Therefore no spatial prediction mechanism is allowed. However, several prediction mechanisms rely on temporal redundancy of data between the frames of the video sequence to improve the compression. For instance, one block in a HEVC tile may be predicted from a predictor block, which is partially or entirely outside of current HEVC tile boundaries. Moreover, the predictor block may be also partially or entirely outside of the frame boundaries since HEVC provides a well-known border extension mechanism to extend the border of the image to allow the predictor block to be partially or entirely outside of the reference image.

Finally, the predictor block may be located at a sub-pixel location. That means that the reference block pixel value is the result of a sub-pixel interpolation filter, which generates sub-pixel value from a range of up to four pixels outside of the block of pixel located at full pixel coordinate corresponding of the predictor block. As a result, temporal prediction may introduce a coding dependency between blocks within a HEVC tile and a set of pixel data located outside the HEVC tile boundaries.

A second HEVC mechanism involved in the temporal prediction consists in predictive encoding of the motion vector using a motion vector predictor.

Finally, HEVC provides a set of loop filters, which introduce dependencies between pixels of contiguous tiles. These loop filters are the deblocking filters and the SAO filter which remove some artefacts introduced in particular by the quantization of the residual blocks. HEVC provides flags in Picture Parameter Sets to indicate whether these loop filters are disabled at the tile or/and slice boundaries. When disabled, no coding dependency between tiles is introduced by these compression tools.

To guaranty the decoding a region of interest (meaning independently decoding the region of interest), a solution is to disable part or all the previously mentioned prediction mechanisms.

This leads to less efficient compression and higher bitrate for the resulting bitstream. It is possible to adapt the activation/deactivation of the prediction mechanisms depending on the region of interest usage scenario in order to optimize the bitrate of the resulting bitstream.

FIGS. 8a and 8b illustrate two different application examples for the combination of regions of interest, already mentioned above.

For instance, in a first example, the FIG. 8a represents two frames 800 and 801 from two different video streams that are constituted of four regions of interest. The first video stream 800 has a high quality encoding parameters and the second 801 is a low quality and thus low bitrate version. A client efficiently combines a high quality version of the region of interest #3 with low quality regions of interest for regions 1, 2 and 4. This permits to emphasize the quality of the region of interest #3 while maintaining the bitrate relatively low for the other, less important, regions.

In a second example, a set of four video streams (803, 804, 805 and 806) are represented in the FIG. 8b. In this usage scenario, the client forms a new mosaic video of different regions of interest of each video stream. He rearranges or combines the region of interest of each video stream to a new location in the resulting video stream.

According to an embodiment of the invention, it is proposed to define a spatial frame portion called here a constrained tile (shortcut as CTile in the following description). It refers to a spatial frame portion belonging to a sequence of frames divided into spatial frame portions that can be randomly be accessed and fully decoded without decoding error. The decoding of a CTile can be performed, independently of its spatial location and/or its neighbourhood. In other words, a CTile is independently encoded or encoded in a way that a decoder is always able to decode it without any error.

The encoded data corresponding to samples forming a CTile is independently encoded. For example, data is encoded into encoded units or NAL units forming slices (or any other parts of frame with similar features), so that one parser could extract the samples corresponding to the CTile. As a result, two CTiles are encoded into two different sets of encoded units. In order to be decoded at any spatial location a CTile cannot be part of a slice that contains other CTiles. Thus, encoded data of a slice corresponding to a CTile is independent of encoded data from other slices.

The encoded data corresponding to a slice may be further divided into several slice segment encoded units.

In an embodiment, CTiles are strictly independently decodable, meaning that all the data needed to parse the encoded data forming a CTiles are contained in said CTile. Moreover, the prediction mechanisms use prediction information computed from the encoded data of the same CTile. For INTER prediction, the reference blocks are retrieved from the same CTile in another frame.

In other embodiments, encoding restrictions may be released.

In a first other embodiment, the border extension mechanism as used for image boundaries. This mechanism schematically illustrated in FIG. 5 is used for CTiles boundaries to allow unrestricted and more efficient motion compensation.

Figure 5:
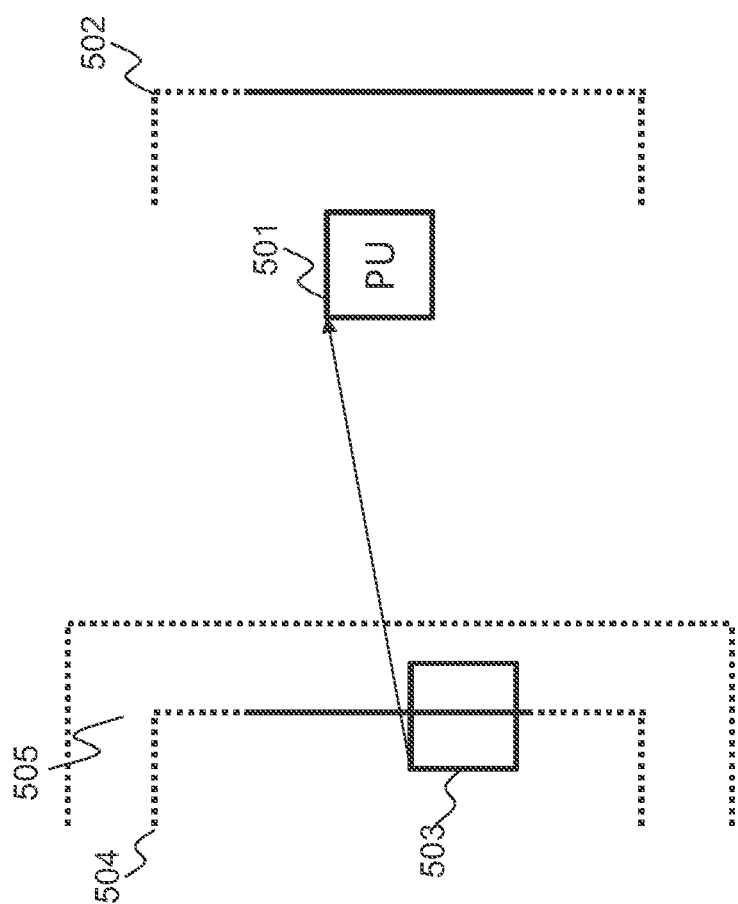
FIG. 5 illustrates the border extension mechanism, used in HEVC for instance.

FIG. 5 illustrates in a simplified way, the border extension mechanism, used in HEVC for instance. This mechanism allows motion compensation in INTER prediction (well-known prediction mode allowing the use of data outside of the current frame) with reference to samples values outside of the frame.

When predicting a block 501 while encoding a frame 502, it useful to allow prediction from a block 503 that is crossing boundary of a reference frame 504. This allows, for instance, to predict a moving content from the same content that was partially outside on the field of view in a previous frame. Preferably, a sample padding method is defined to allow to access samples within a margin all around the frame boundaries of a reference picture.

In a second other embodiment, derivation mechanisms of motion vector predictors (or any other predictor) can be authorized for the CTiles in a way that it does not depend at all from any neighbouring tiles information, nor on the tiling configuration.

Figure 9:
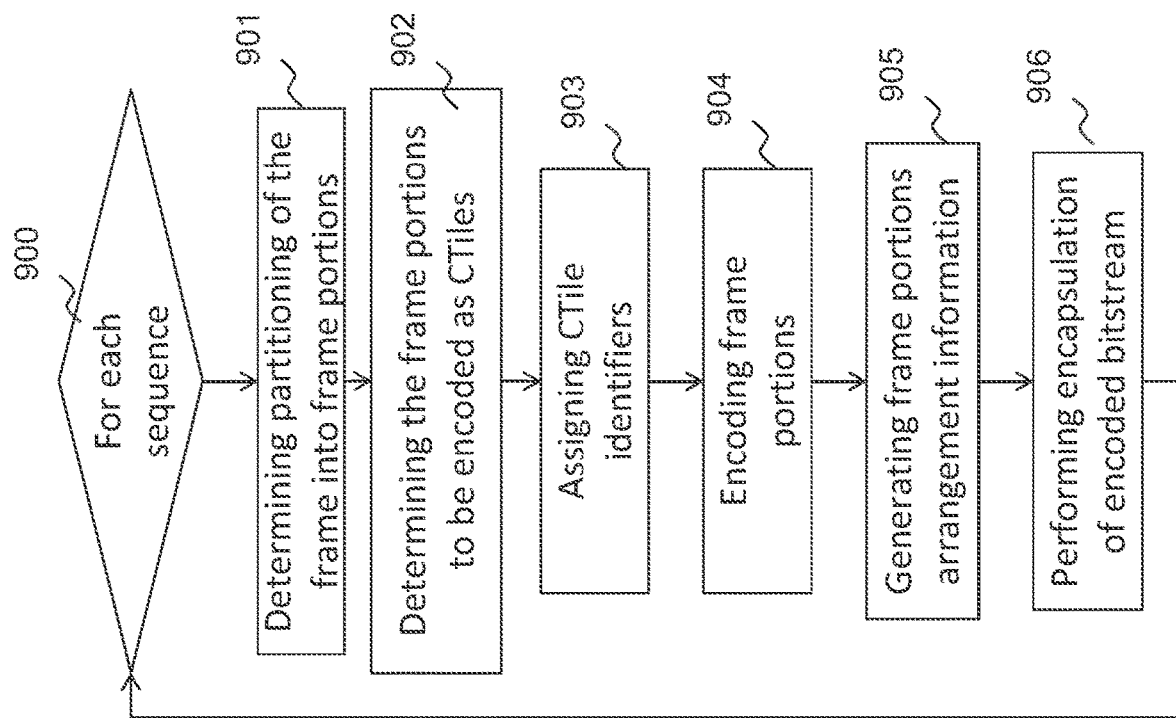
FIG. 9 illustrates a typical encoding process of a video encoder in which the invention is integrated.

FIG. 9 illustrates an example of an encoding process implemented in a video encoder according to the invention.

First, for each considered input video sequence 900, the encoder determines a partitioning (i.e. a frame portion arrangement) of the frames into frame portions in a step 901. In some embodiments, the size of the frame portion is pre-determined such that one frame portion covers a single or a part of a region of interest. For instance, the frame portion may have a size of 512×512 pixels.

The encoder then determines which frame portions have to be encoded as CTiles in a step 902. For example, such a frame portion can correspond to a region of interest (ROI) that a client may want to decode alone or that a client may want to compose with one or more other regions of interest.

Then the encoder determines and assigns identifiers to every CTiles in a step 903. In a variation, the encoder may determine and assign identifiers to a selection of CTiles only. In a variation, identifiers of CTiles may be inferred.

When same identifiers are assigned to CTiles into several encoded frames, it means that these CTiles belong to a same CTile sequence. A sequence of CTiles (or CTile sequence) can be decoded independently of the other frame portions. Only data from the CTile sequence is needed for decoding said CTile sequence. In other words, CTiles from the CTile sequence may have temporal dependencies together.

After determining the CTiles and CTile identifiers, the encoder compresses and encodes the frame portions 904 according to the encoding configuration. The encoding of the frame portions ensures that any decoder could decode them as previously described.

The encoder generates a frame portion arrangement information in a step 905. The frame portion arrangement information consists in determining the description parameters of the frame partitioning into frame portions. It also consists in determining the description parameters of the CTiles by associating CTile identifiers to their position in a frame or in a sequence of frames. Different signalling alternatives are proposed, described with reference to the FIG. 13a, FIG. 13b and FIG. 13c (first alternative) or in FIG. 15 (second alternative). The step 905 comprises generating signalling tiling parameters in Parameter Sets (XPS). In a variant, the step 905 is performed prior to the encoding step 904 instead of after.

A step 906 comprises an optional encapsulation of the NAL unit of the XPS, and the compressed CTiles frame portions into a bitstream.

For example, based on the streaming protocol, this step may further include the encapsulation of the bitstream inside of a higher-level video description format like ISO BMF File Format for instance. It may also allow multiplexing the video data with audio data for instance.

Steps 901, 902 and 903 can be implemented by using one or more configuration files providing pre-determined frame portions positons, providing information whether frame portions are CTiles and which identifier has to be used for the CTiles. In an alternative embodiment, the frame portions and CTiles can be automatically determined from an analysis of the video content, using deep neural network for instance, or a simpler segmentation algorithm.

As described in some embodiments, step 901 can be used to determine a partitioning that is constant within the whole video sequence (or a least for several consecutive frames within a video segment). This means that the positions and the sizes of the CTiles are constant within a whole CTile sequence of at least within several frames containing part of the CTile sequence.

Alternatively, the determined frame portions may have variable sizes and positions between frames.

Figure 10:
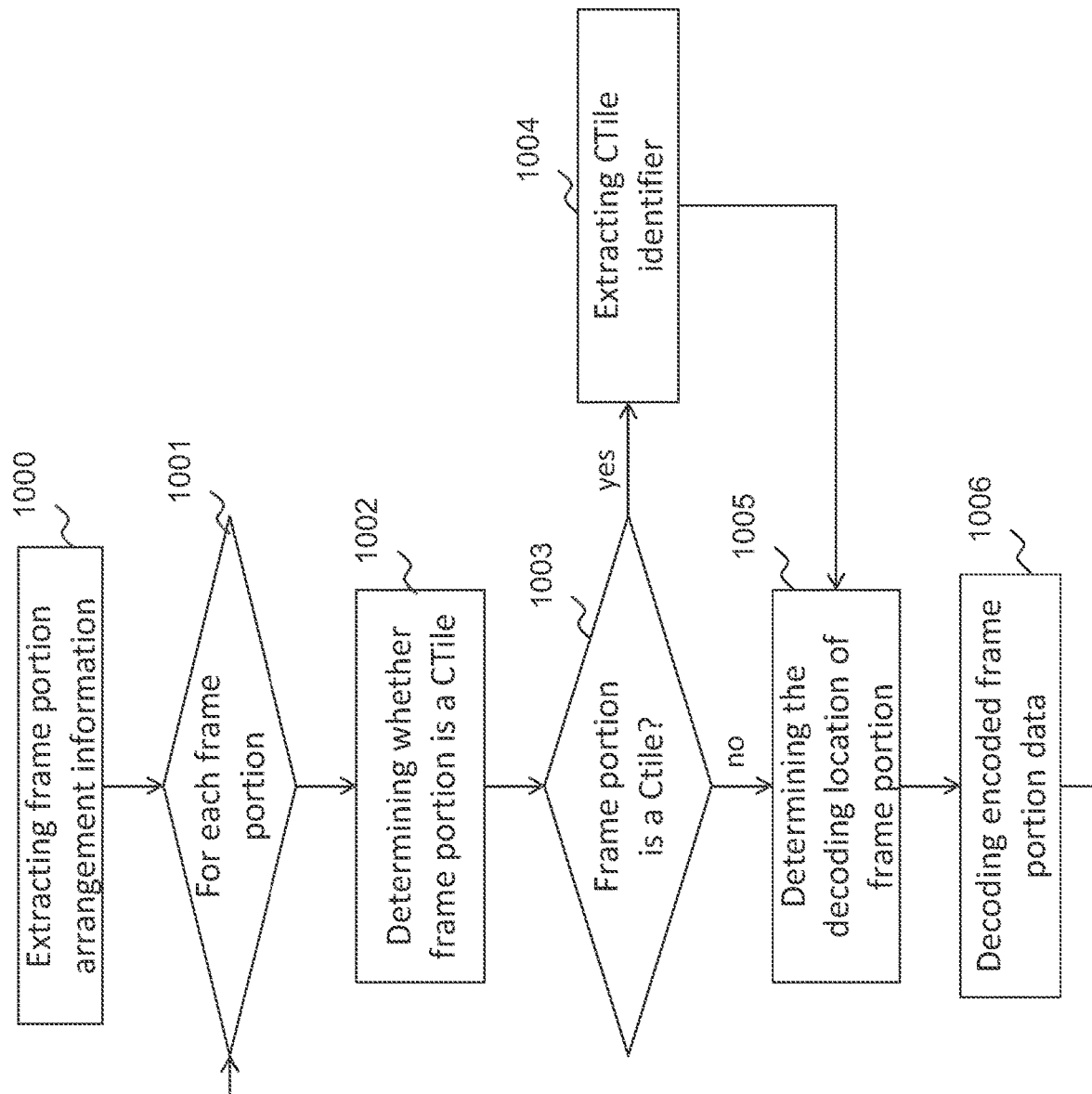
FIG. 10 illustrates a typical decoding process of a video decoder in which the invention is integrated.

FIG. 10 illustrates an example of decoding process implemented in a video decoder, in a video decoder. The decoding process involved the use of the CTiles as defined above.

First, the video decoder extracts NAL units containing the Parameter Sets (XPS). A frame portion arrangement information is obtained from the Parameter Sets in a step 1000.

For each considered frame portion, 1001, the decoder determines in a step 1002 from the frame portion arrangement information if the frame portion is a CTile.

If the frame portion is signalled as a CTile, branch 'yes' after test 1003, the decoder extracts (or inferred) the CTile identifier from the frame portion arrangement information, and determines in step 1005 the decoding location of the CTile, thanks to the CTile identifier and a CTile position information that are associated with the identifier. Otherwise, when the frame portion is not a CTile, branch 'no' after test 1003, the decoder determines in a step 1005 the decoding location of the frame portion from a positioning information that is described in the frame portion encoded data and from XPS information.

Finally the decoder decodes the frame portion encoded data 1006, taking into account that the frame portion is a CTile or not, and put the decoded sample values inside of a rendering picture buffer.

Figure 11:
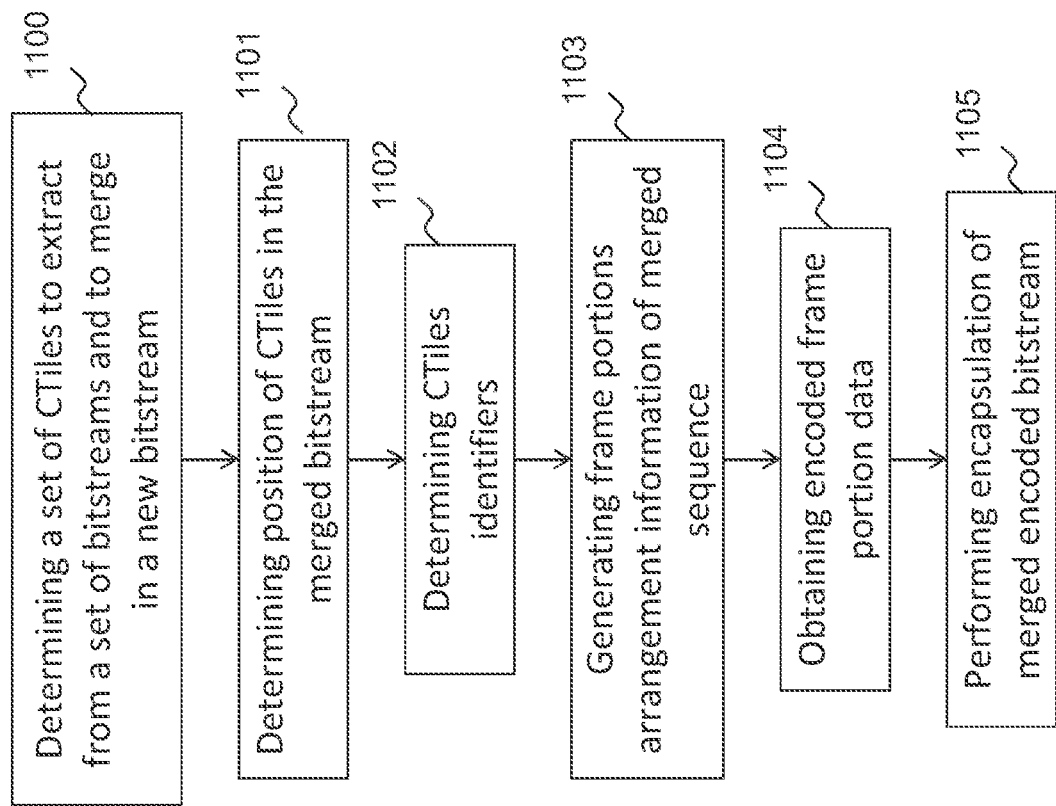
FIG. 11 describes an exemplary use of the invention.

FIG. 11 describes an example of merging process (see applications in FIG. 8a and FIG. 8b) of two bitstreams generated with the encoding process of FIG. 9. The merging process implies that the extracted CTiles are combined into a new video bitstream to be sent to the client.

The merging process starts by determining in a step 1100 a set of CTiles to be extracted from one or more video bitstreams, and to be merged into a new bitstream. For example, a graphical user interface allows a user to select the set of CTiles and also to rearrange them in the frame. In another example, the selection is automatically performed based on the content of the bitstream. The application may select a set of CTiles that containing moving content.

The process determines in a step 1101 the new position of the CTiles when being merged in the new video bitstream.

Once CTiles to be extracted are known, their new identifiers are determined in step 1102 by obtaining the current CTile identifiers of each one of the determined CTiles to be extracted. These identifiers are signalled in the frame arrangement information according to embodiments of the invention. As previously said, in an alternative embodiment, the frame arrangement information may be described in a file format used to encapsulate the input bitstreams. Frame arrangement information may be present may be in a XPS and in a file format.

In case of identifier collision, meaning that more than one CTile have the same identifier, the step 1101 further comprise determining new CTile identifiers for solving these collisions.

Then, the process generates 1103 a frame portion arrangement information for the merged video sequence of the new video bitstream. It comprises generating the parameters in one of the XPS that associate the new position of CTiles in the merged bitstream with their new CTiles identifiers. In a step 1104, the encoded frame portion data of the set of CTiles determined in step 1100 are extracted or obtained. It comprises retrieving the NAL units containing the encoded frame portions data of the CTiles. This may be done by parsing all the NAL units in the input bitstreams, inorder to extract the ones having the CTile identifiers determined in step 1102. When the input bitstreams conform to a file format specification, all the NAL units corresponding to one frame portion are encapsulated in one container for example a video track for ISOBMFF. The step 1104 then comprises retrieving the data corresponding to the track of the selected frame portions.

Finally, in an optional step 1105 a new bitstream is generated by embedding the NAL units of the XPS, and of the NAL units of containing the extracted CTiles encoded frame portion data into a new bitstream, and possibly encapsulating this bitstream into a higher level description format.

For the CTiles for which a new CTile identifier was determined in step 1101 because of a CTile identifier collision, the step 1105 further comprises modifying the headers contained in the NAL units, which contains the original CTile identifier. These headers are modified so that the original CTile identifier is replaced by the CTile identifier determined in step 1102.

In one example, the merging process of FIG. 11 consists in extracting a subset of CTiles from the same bitstream. In such a case, there is no need to handle identifier collision.

Figure 13A:
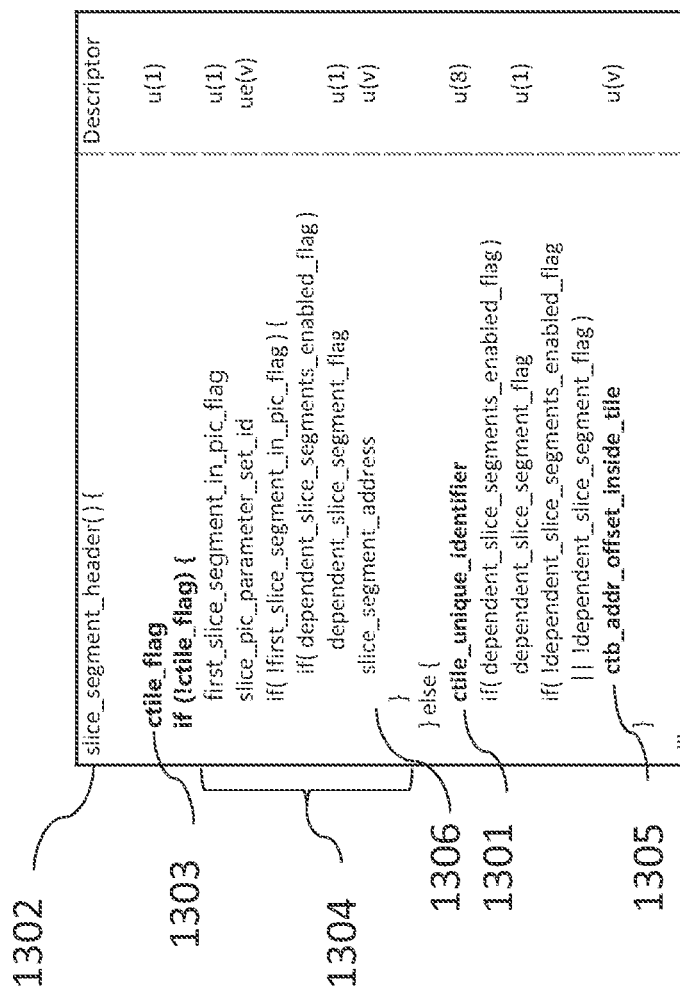
Figure 13C:
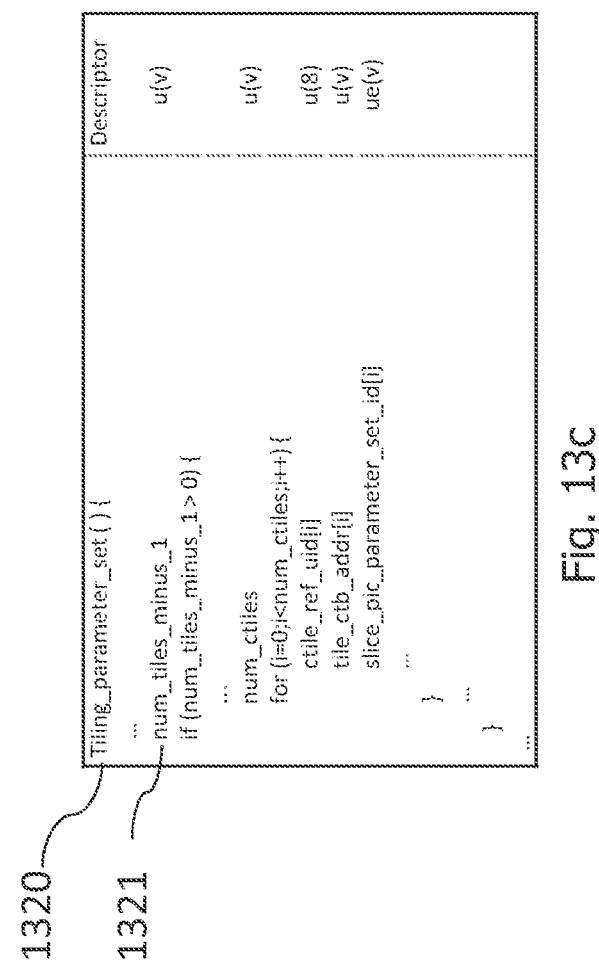

FIGS. 13a and 13b and 13c illustrate examples of signalling of the frame portion arrangement performed by the encoding process concerning according to several embodiments of the invention.

FIG. 13a illustrates the identification of CTiles in the bitstream according to an embodiment of the invention.

A CTile identifier named here ctile_unique_identifier 1301 is indicated in the frame portion encoded data. Preferably, the identifier is indicated in each data sequence (i.e slice segment header) belonging to the frame portion encoded data. Thus, it allows:
an easy identification about which portions of the bitstream are belonging to the CTile, and
a quick access or extraction of these portions.

More precisely, in the embodiment illustrated in FIG. 13a, The CTile identifier 1301 is signalled in the slice segment header (slice_segment_header) 1302 of each slice segment corresponding to the CTile with identifier 1301.

As previously mentioned, a decoder parses the CTile identifier to determine the associated location of the CTile, based on frame portion arrangement information. According to embodiments, the frame portion arrangement information is provided in a parameter set for example TPS) as will be described later with reference to FIG. 13b or FIG. 13c.

For the sake of simplicity in the following unless explicitly mentioned or not applicable, there will be no distinction between a CTile and a CTile sequence. Furthermore, the CTile identifier can also be seen as a CTile sequence identifier.

In an embodiment, in order to distinguish HEVC-type tiles, for which an identifier is not necessarily required, from CTiles, an information like for example a ctile_flag 1303 may be used in the data sequence belonging to the frame portion encoded data (in the slice segment header for instance). If the ctile_flag is inactive (for example set to 'false'), parameters 1304 for HEVC-type tiles are provided. Those parameters could include a tile positioning information, like the first_slice_in_pic_flag or a CTU address (slice_segment_adress) for instance, or references to other bitstream elements, like slice_pic_parameter_set_id. These syntax elements depend on the frame partitioning and may differ from one video sequence to another.

When ctile_flag is active, these parameters are omitted and CTiles specific information comprising the CTile unique identifier 1301) are provided instead. To allow the possibility to have multiple slices in a CTile, one solution is to provide information named here: ctb_addr_offset_inside_tile 1305. This piece of information 1305 also used to specify the position where to start the decoding of the slice segment relatively to the CTile position with the considered frame. For example, this position is expressed in raw scan ordered number of coding blocks (for example CTB which is the HEVC standard coding tree block), relatively to the beginning of the CTile and to its width (in CTB), and so the ctb_addr_offset_inside_tile information is independent of the CTile encoding/decoding position.

In another embodiment, the flag ctile_flag is not used. For example, the CTile identifier is present in all tiles, CTiles and other tiles (HEVC-type tiles). A predetermined value, for example the value zero, may be used to identify the HEVC-type tiles.

In an embodiment, an information is provided to identify whether a spatial frame portion is a CTile or not.

In another embodiment, no information is provided to identify whether a spatial frame portion is a CTile or not, assuming that only CTile are the only used frame portions.

Preferably, in a given frame, there is no more than one CTile with a given identifier. The same CTile identifier is used in all the CTiles that are temporally dependent (for example in a CTile sequence). Thus, if the CTiles with the same CTile identifier in successively encoded pictures, are extracted, they would be properly decoded.

In other words, the CTile identifier is a unique identifier that identify the CTile within the encoded video sequence. In an embodiment, the CTile identifier is inserted in the slice headers of the slice segments contained in the CTile. This means that in a bitstream, the NAL units (slice segments) corresponding to a CTile contain the CTile identifier. Therefore, any CTile may be parsed and extracted easily from a bitstream based on this CTile identifier.

It is advantageous to signal CTile arrangement information in the bitstream. For example, CTile arrangement information is defined by the number of CTiles, the associated CTile identifiers and the location of the CTiles in the frame.

FIG. 13b illustrates a CTile arrangement according to an embodiment of the invention.

In a first embodiment, the encoder specifies additional signalling information related to the frame portion arrangement information of the CTiles in the picture to be decoded.

The signalling information is provided in a parameter set (XPS), preferably in a tiling parameter set (TPS. Preferably, the additional signalling information includes a number 1311 of CTiles in the picture called here num_ctiles. for each CTile, it associates the unique identifier 1312 of the CTile along with the CTile position 1313, called here tile_ctb_addr, meaning the decoding position inside of the picture. The CTile position is provided as a decoding position in the picture. It may be expressed in a CTB index number (relatively to a raster scan order for instance).

In another embodiment, a parameter named here slice_pic_parameter_set_id, which is also mentioned in the slice segment headers represented in FIG. 13*a* in the part designated by 1304, refers to a unique identifier representing a TPS. In a variation, the unique identifier represents a PPS. In this other embodiment:
  each TPS includes a tile_parameter_set_id (not illustrated for simplification) parameter which identifies the TPS—for example, each time the CTile arrangement changes in the picture, implies that the encoder may generate a new TPS—it is recommended generating a TPS with the same TPS (or PPS) unique identifier to avoid rewriting each slice header of the frame;
  the slice_pic_parameter_set_id 1314 of slice segment header is equal to the tile_parameter_set_id of the TPS that applies for the slice. In such a case, the naming of slice_pic_parameter_set_id of slice segment header may be renamed slice_tile_parameter_set_id.

In one alternative, the TPS identifier is unspecified in slice data: the decoder infers that the last TPS NAL unit preceding the slice NAL units contains the frame portion arrangement for the current CTile.

FIG. 13*c* illustrates a CTile arrangement according to another embodiment of the invention. According to this embodiment a TPS 1320 contains a parameter value indicating the number of tiles minus one, for instance 'num_tiles_minus1' 1321. Alternatively, the TPS contains a parameter value named for instance 'num_tiles' that provides directly or indirectly the number of tiles in the frame.

In an embodiment, if the TPS indicates that there is only one frame portion, it is assumed that this is a CTile, which have the same dimensions as video frames and is positioned at its origin. Else (TPS describes several frame portions) the frame portion positions are described as in previous embodiments.

In another embodiment, if there is no TPS it is assumed that there is one CTile, which has the same dimensions as the video frames. Said one CTile is positioned at its origin.

According to another embodiment, TPS can describe a spatial frame portion grid with a syntax similar to an HEVC grid: for instance specifying 'num_tile_rows_minus1', 'num_tile_cols_minus1', and a 'uniform_spacing_flag'. If the 'uniform_spacing_flag' is not set, the width of each column and the height of each row (except the last row and column sizes that can be deduced) are specified also. If the 'uniform_spacing_flag' is set, the CTile widths and heights are computed from the picture width and height, like in the HEVC specification for instance. In such embodiments, the CTile position may be expressed by a CTile number corresponding to a spatial frame portion grid index (using raster scan order of the tiles for instance), since the grid index allows to localize the corresponding CTile.

According to an alternative embodiment, the 'ctile_flag' is replaced by a 'ctile_level' that can take several values, each value indicating a different level of encoding constraints applied to the CTile. For instance a ctile_level equals to zero indicates that the CTile is not constrained (like the HEVC-type tiles). A ctile_level equals to '1' indicates that the CTile is constrained such that it can be extracted and properly decoded alone (without it original neighborhood) or that it can be decoded with its original neighborhood, but that it may not be properly decoded if shuffled with other CTiles. A ctile_level equals to '2' indicates that the CTile is constrained such that it can be decoded anywhere, and shuffled with any neighborhood (equivalent to ctile_flag equal to one in previous embodiment).

In another embodiment, the 'ctile_level' just provides an information that the encoder took its encoding decisions to satisfy the level of constraint. Thus the decoding process of a CTile with any levels of constraint may be implemented by the same decoding process as HEVC-type tiles (no border extension is performed on the CTile boundaries for instance).

In another embodiment, the encoding and decoding processes are not the same for all level of constraints. For instance, a CTile with a ctile_level equals to '1' uses the same decoding process as HEVC-type tiles (some restrictions where used at the encoder, not impacting the decoder), while a CTile with a ctile_level equal to '2' must be decoded using a border extension on the CTiles boundaries, and using a specific derivation process of the lists of motion vector predictors.

According to another embodiment, even HEVC-type tiles may need to have an identifier (for instance to associate their parameters in an XPS), then this identifier is specified in the slice segment header in a similar way to the CTile identifier. In a given frame, an HEVC-type tile does not have the same identifier as a CTile nor as another HEVC-type tile.

According to one embodiment, the encoder indicates that a spatial frame portion is a CTile by signalling the values of the 'ctile_flag' of each spatial frame portion in one of the Parameter Sets for example the PPS or the TPS. For instance, the encoder generates a unique identifier for each tile of the frame. When describing the frame portion arrangement, the encoder associates a flag (e.g. ctile_flag) to each tile unique identifier. This flag is true when the encoding of corresponding tile (i.e. the tile with the identifier equal to the associated unique identifier) is constraint to ensure an independent decoding. On the contrary, the flag is false when the encoding of the tile is not sufficiently constrained to ensure an independent decoding.

According to a second embodiment, the encoder generates a frame portion arrangement information that includes another flag (e.g. all_ctile_flag). If this flag is set to '1', it means that all the tiles described in the frame portion arrangement are CTiles. The flags (e.g. each ctile_flag) signalling if a spatial frame portion is a CTile or not, are omitted and are inferred to be equal to true. If this flag is set to zero, the CTiles are explicitly described using one of the previous embodiment. If parameters are specific to HEVC-type tiles, they are signalled in a XPS instead of in the slice segment header, in a TPS for instance. For instance, the slice_segment_address, incorporated in the reference by in 1304 for another embodiment, is specific to HEVC-type tiles. In an embodiment, it is indicated in the TPS, if the TPS also indicates that the spatial frame portion is not a CTile. This embodiment allows simplifying the syntax and the parsing of the slice segment header.

According to another embodiment, the encoder defines new NAL unit types for slice data that corresponds to a CTile instead of using a 'ctile_flag' in the slice segment header. For instance, the encoder defines the CTILE_IDR NAL unit for a slice NAL unit from an instantaneous decoding refresh (IDR) frame that is inside a CTile. The encoder defines as many new NAL unit types as the encoding format specifies for regular slice data. For instance, HEVC defines the following NAL unit types CRA_NUT for slice segments of a clean random access (CRA) picture; IDR_W_RADL for slice segments of a random access decodable leading (RADL) IDR picture; IDR_N_LP for slice segments of an IDR picture with no associated leading pictures present in the bitstream; BLA_W_LP, BLA_W_RADL, BLA_N_LP for slice segments of a broken link access (BLA) picture; RASL_N, RASL_R for slice segments of a random access skipped leading (RASL) picture; RADL_N, RADL_R for slice segments of a RADL picture; STSA_N, STSA_R, for slice segments of a step-wise temporal sub-layer access (STSA) picture; TSA_N, TSA_R for slice segments of a temporal sub-layer access (TSA) picture; and TRAIL_N, TRAIL_R for slice segments of a non-TSA, non-STSA trailing picture.

W_LP: may have associated RASL or RADL pictures; W_RADL: no associated RASL picture; N_LP: no associated leading picture; *_N: the picture is a sub-layer non-reference (SLNR) picture (otherwise it is a sub-layer reference picture); *_R: the picture is just a sub-layer reference picture.

These HEVC NAL units types may be extended with new corresponding NAL unit types CTILE_BLA_*, CTILE_CRA_*, CTILE_IDR_*, CTILE_RASL_*, CTILE_RADL_*, CTILE_STSA_*, CTILE_TSA_*, CTILE_TRAIL_* with the same purpose for constrained tiles data. Using one of these new NAL unit types indicates that the NAL unit belongs to a CTile.

This alternative simplifies the decoding process since the encoder has only to parse the first bits of each NAL units to determine if the slice data is inside CTile or not.

Preferably, the unicity of the CTile identifier is guaranteed by construction at encoding for a given sequence, meaning in a given bitstream. However, when shuffling CTiles from different sequences, meaning coming from different bitstreams, the unicity is not guaranteed. According to an embodiment, in order to ease spatial frame portion shuffling with CTiles potentially coming from various sequences, the CTile identifier is unique on a limited number of bits. The unique value can be a random value, for instance, a hash value or any other value that is not necessarily representative of its position. Thus to reduce the probability to have an identifier collision when taking CTile of different bitstream.

In an embodiment, when performing shuffling of CTiles from multiple sequences, in case of collision between two CTile identifiers, it is sufficient to replace the collided CTile identifiers. In order to do it efficiently by not being obliged to regenerate all the slice segment headers, in a preferred embodiment, a fixed predetermined number of bits is used to encode the CTile identifier. For instance, in FIGS. 13a and 13b CTile identifier is encoded on 8 bits.

In an alternative embodiment, all the CTile identifiers of a sequence or of a picture are encoded on the same number of bits. This number of bits is specified in a parameter of one Parameters Set such as the SPS, PPS or RPS, 'uid_num_bits' for instance. In the slice segment header, it is preferred to have byte alignment mechanism after the CTile identifier (when it takes a number of bits that is not multiple of 8). Alternatively, the number of bits may be expressed in number of bytes (8 bits): 'uid_num_bytes' for instance. When shuffling CTiles from various sequences together, it may be needed to change CTiles identifiers when they do not have all the same number of bits. This will require changing several slice segments headers, but will be easier than updating slice segment header, because only byte(s) will need to be added/removed or replaced.

In yet another alternative embodiment, each CTile identifiers may be encoded with a variable number of bits. That number of bits is specified in the slice segment header. Alternatively, the number of bits can be automatically determined from the code used for the CTile identifier: variable bytes length codes are used, for example Exponential Golomb coding (or equivalently variable length code followed by byte alignment bits).

According to embodiments, the CTile identifier is not signalled in the dependent slice segment header, to reduce signalling size. Then the CTile identifier of a dependent slice segment header is inferred from the previous independent slice segment header. According to an alternative embodiment, the CTile identifier is signalled in dependent slice header in order to facilitate the parsing and the extraction of sub-bitstream containing CTile.

As an alternative to signalling a CTile position with 'tile_ctb_addr [i]' 1313 or 'slice_segment_address' 1306 coding unit address, fine-grained CTiles are introduced, with a finer granularity positioning. This granularity can be refined up to luma sample position, but in another embodiment, a granularity of a number of luma samples corresponding to a power of '2' (smaller than CTU size) is sufficient. In some embodiments, the granularity may be predetermined. In an alternative embodiment, the granularity is signalled in VPS, SPS or PPS for instance. When fine-grained CTiles are used, the dimensions of a CTile are not necessarily multiple of the CTU size.

When the size of the CTile is not multiple of the CTU size, the coding units on the right and on the bottom sides of a CTile is using an automatic splitting mechanism similar to the one used for HEVC CTUs on the right and bottom side of a picture, as depicted with FIG. 4.

According to an alternative embodiment, even if the coding units are incomplete, the syntax will describe a full coding, letting some space for rate distortion optimization of the decomposition tree (quatree or QTBT for instance), and allowing an eventual padding of information suited to improve the compression.

In HEVC-type tiles, dimensions are specified using a grid. Hence all HEVC-type tiles are aligned by rows and columns, and all HEVC-type of a given row have the same height, and all HEVC-type tiles of a given column have the same width. The width of each column and the height of each row is specified in an XPS. With fine-grained HEVC-type tiles, it may be convenient to allow less strict arrangements, to allow more efficient coding of multiple ROIs for instance.

According to an embodiment, the dimensions of a CTile may be specified in the slice segment header of the slice segment of the CTile. To reduce the size of the resulting bitstream, the dimensions of a CTile are specified only in the first slice segment. Following slice segments reuse the same CTile dimensions. As an alternative, the dimensions of all the CTiles are provided in an XPS, for instance together with the CTiles positions.

As another alternative, the dimensions are provided both in the first slice segment header of the CTile and in the XPS.

Figure 14:
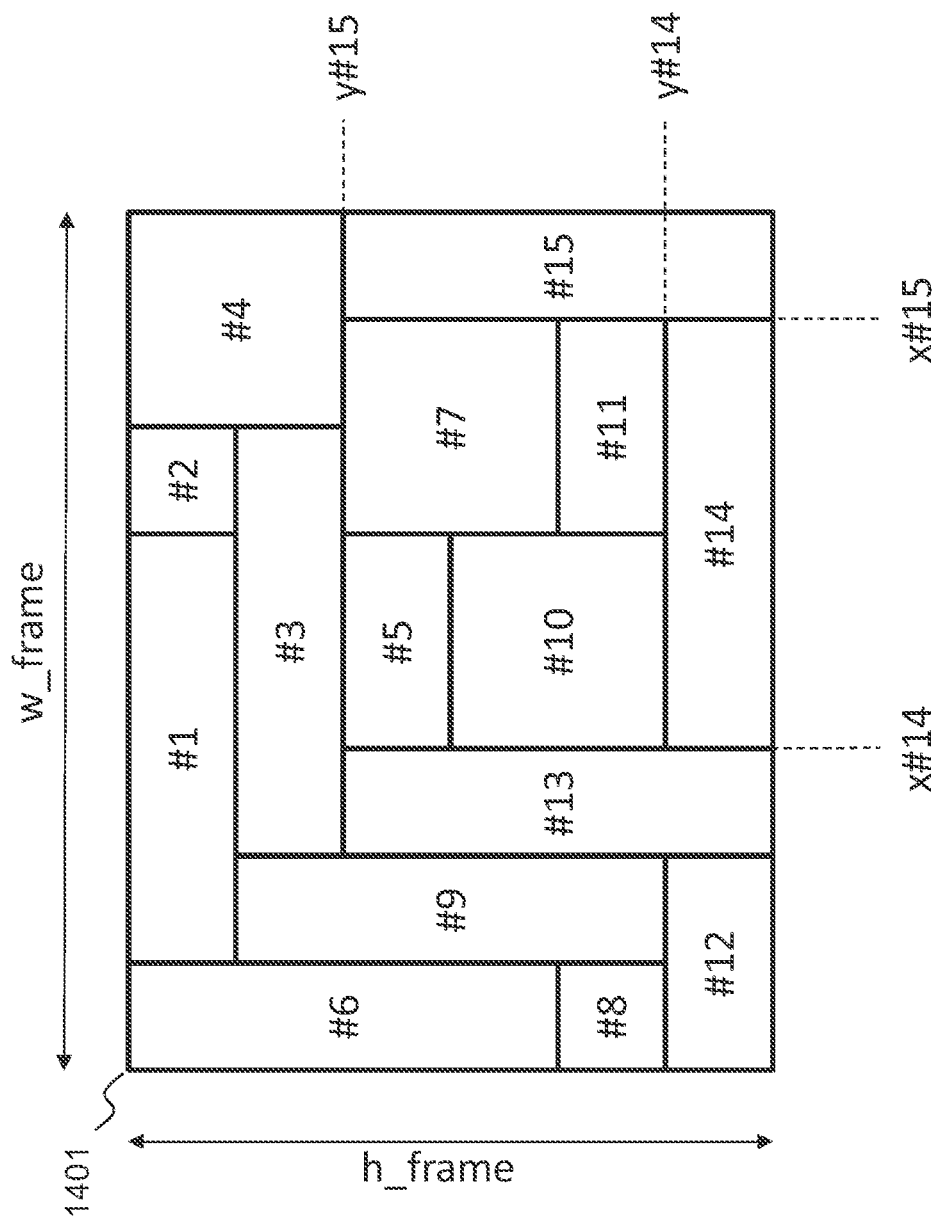
FIG. 14 illustrates an example of non-grid based partitioning.

As another alternative, the dimensions of the CTiles are not provided, but are deduced from an ordering that is used to provide tiles information (position or 'ctile_flag' for instance) in the XPS and from the CTile position: for instance, the CTiles positions are declared in an XPS, and the CTile positions are ordered so that each corresponding bottom right corner of the CTile is ordered in increasing raster scan order (for instance). FIG. 14 below provides an example of such ordering.

According to an embodiment, the dependent_slice_segment_enabled_flag, used in the example of FIG. 13*a*, has the same meaning as in HEVC: it is used to indicate if dependent slice segments are allowed or not. In HEVC the dependent_slice_segment_enabled_flag is signalled in the PPS. According to our preferred embodiments, the dependent_slice_segment_enabled_flag is signalled in the tiling_parameter_set (TPS) for each CTile (in order to allow the use of CTiles encoded with dependent slice segments together with CTiles encoded without dependent slice segments in the same bistream). To reduce the syntax in the TPS of common use cases where all the CTiles are encoded with or without dependent slice segment, another flag is used at the root of the TPS structure: dependent_slice_segment_enabled_flag_for_all_ctiles. When this flag is set to one, the dependent_slice_degment_enabled_flag is not signalled for each CTile. Instead, a ctile_dependent_slice_segment_enabled_flag is also signalled at the root of the TPS structure, and provides the value to be inferred for the dependent_slice_degment_enabled_flag of each CTile. For HEVC-type tiles, the dependent_slice_segment_enabled_flag can still be signalled in the PPS, but in preferred embodiments it is signalled in the TPS.

According to an alternative embodiment, the dependent_slice_segments_enabled_flag is not signalled at all and is always inferred as true, in order to simplify the syntax.

FIG. 14 illustrates an example of non-grid based partitioning. The frame 1401 is split in 15 CTiles numbered from #1 to #15. This numbering provides the order of declaration of the tiles position in the XPS so that the bottom right corner of each tile is ordered in raster scan order. Using this ordering the size of each CTile can be deduced. For instance, taking the last CTile, CTile #15, it dimensions can be deduced, because, being the last tile, its bottom right corner is the last in raster scan order, and so it is the bottom right corner of the frame. Dimensions of slice #15 are then the dimensions of the frame, minus its position: h #15=h_frame−y #15; w #15=w_frame−x #15. Tile #14 must have the last bottom right corner before CTile #15 as its own bottom right corner, so the bottom right corner position is the bottom most (bottom of the frame), and the right most (just on the left of previous tile). CTile #14 dimensions are then h #14=h_frame−y #14; w #14=x #15−x #14. The same is repeated for tiles #13 and #12. Then for tile #11 since the bottom most positions are filled, the new bottom most position is y #14. Then h #11=y #14−x #11. And so on until CTile #1.

According to alternative embodiments, instead of specifying the CTile positions in the XPS, only the CTile dimensions are specified, and the CTile positions are computed from the CTile dimensions, using CTiles ordered according the top-left position (in increasing raster scan order for instance). The algorithm to compute the positions from the dimensions may be easily derived from the algorithm described previously to compute the dimensions from the positions.

According to an embodiment, CTile parameters described in the XPS may provide CTile position (and/or CTile dimensions) for non-existing CTiles: there will be no slice segment for those CTile. This CTile description is necessary, to allow proper inference, in the embodiments where only the positions or the dimensions are provided and the dimensions or positions are inferred.

For the video rendering a default sample value, or padding method, is used for filling the non-existing CTiles, or alternatively the value or an index of padding method is provided in an XPS parameter. This can be implemented for instance, by adding a preliminary step at the beginning of the decoding process (before the step 900 in FIG. 9 for example) which consists in initializing the content of the frame in the rendering buffer with the appropriate default sample value, and/or adding a new step after all the frame portions have been decoded which consists in padding all the areas not covered by any tile or CTile, by using an in-painting method for instance.

According to an embodiment, it is possible to handle multiple CTiles at the same spatial position, or CTiles that are overlapping. For each CTile identifier there is an associated decoded CTile buffer (equivalent to decoded picture buffer (DPB) in HEVC, but here containing only decoded CTile data). For a given frame each CTile is decoded using the temporal data available in the associated decoded CTile buffer. Then according to a first alternative, the rendering order of the CTiles is the same order as CTile order in the bistream. In a second alternative, the CTiles are associated with a rendering order that can be determined from XPS data. For both alternatives, the samples of the decoding results of each CTile are put in a frame of a rendering frame buffer in the rendering order of the CTiles (then possibly erasing/masking samples previously put by previous CTile in order).

According an embodiment, the CTile samples further includes and alpha channel indicating a level of transparency that shall be applied when rendering the CTile in the frame of the rendering frame buffer. Alternatively, the sample further includes a binary mask value indicating which samples of the CTile have to be rendered in the frame of the rendering frame buffer.

According to an embodiment, where it is possible to handle multiple CTiles at the same position or CTiles that are overlapping, both CTile position and CTile size must be specified in XPS as it is not possible to deduce one from the other in that context.

According to embodiment for any given post-filtering algorithm (deblocking filter, sample adaptive offset, or adaptive loop filter for instance) a CTile boundary post-filtering flags may be specified in XPS to indicate if the post-filtering algorithm is usable or not for the CTile. The CTile boundary post-filtering flag, for example 'usable_for_post_filtering_flag', indicates that the given post filtering algorithm may be applied on the CTiles boundary in the rendered frame of a rendering frame buffer (not in the decoded picture buffer, as it could modify temporal decoding). Advantageously, it aims at improving visual quality for instance. The flag may be specified for the whole frame level and/or for each one of the CTile. This flag may be useful to prevent filtering of some edges that are known to be prone to introduce artefacts when post-filtered. For instance, the flag would be true for CTiles shuffling in the context of adaptive quality streaming, but it would be false if the CTile boundary is between two faces of a cubical projection of 360° content and the faces are not adjacent on that edge. The CTile borders that are post-filtered are the ones for which the two side of the edge are specifying that post filtering can be applied, or when the edge is between a HEVC-type tile and a CTile authorizing post-filtering.

According to an alternative embodiment, CTile boundaries may be post-filtered in the decoded picture buffer (DPB), in that embodiment, to ensure that the decoding is correct in any decoding configuration, when INTER prediction is used, the samples used for the prediction are those that are not post-filtered. Hence, the border extension mechanism is applied to the last samples on the border before the post-filtered one using boundaries information, meaning that border extension is performed on non-filtered samples.

According to an alternative embodiment, more than one CTile may have the same CTile identifier. In this embodiment, the CTile identifier becomes a CTile set identifier. The set of CTiles forming a CTile set must be kept all together and with the same relative positioning in order to be properly decoded.

In these embodiments, the position and size of the CTile set is inferred from the XPS. It corresponds to the positon and size of the bounding box of the set of CTiles belonging to the CTile set. Thus in the XPS, a CTile set identifier is associated to one or more position and size (one for each CTile in the CTile set).

In these embodiments, slice header the segment 'ctb_addr_offset_inside_tile' 1305 information may be replaced by a 'ctb_addr_offset_inside_tile_set' information. 'ctb_addr_offset_inside_tile_set' allows to deduce to which CTile belongs the slice segment, and so the geometry to be used while decoding the slice segment.

In one of such embodiments, any sample of the set of CTile can be used for temporal motion compensation. If a motion compensation uses sample values outside of the CTile set, this sample values is set to the value of the spatially closest sample of any one of the CTile sets (equivalent to applying a border extension, but only for CTile boundaries portions that are not shared by two CTiles). If any sample outside of a CTile has more than one closest CTile sample, a simple rule is used to determine which one to use, for instance the one with smallest raster scan order.

Figure 15:
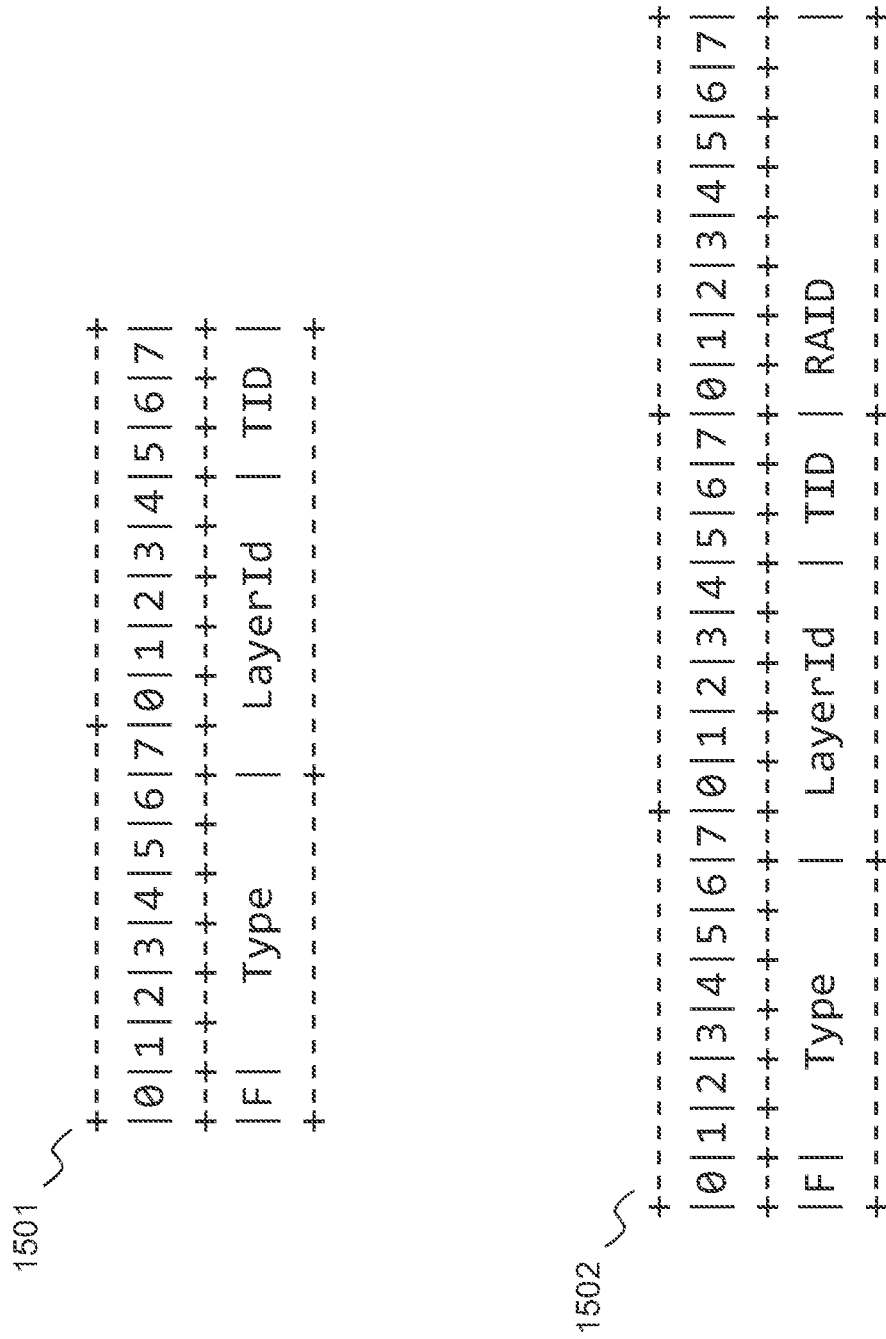
FIG. 15 illustrates alternative embodiments to signal a CTile identifier.

FIG. 15 illustrates alternative embodiments to the ones illustrated in FIGS. 13a, 13b and 13c to signal a CTile identifier. In current block based codec, typical HEVC, the NAL unit header 1501 contains the following fields:
one bit set to 0: (False);
six bits containing the NAL unit type: (Type);
six bits containing a layer identifier: (LayerID), which is always equal to zero in HEVC but corresponds to a scalable layer index in scalable HEVC (SHVC) or to a view index in multi-view HEVC (MV-HEVC) for instance; and
3 bits indicating a temporal layer identifier: (TID), which corresponds to a temporal layer index for temporal scalability in HEVC.

In an embodiment based on the NAL unit header 1501, the encoder splits the video sequence into frame portions. The encoder uses one encoding or scalability layer for each frame portion. This may be seen as layer encoding based on spatial region. The encoder may encode each spatial region layer independently of other regions. In such a case each spatial region layer correspond to one CTile. In this particular case, all the slices of the spatial region layer when encoding have a ctile_flag set to true. The main difference is that each spatial region layer may be further divided into HEVC-type tiles.

The encoder signals the different spatial region layers with the LayerId. It sets the value of the LayerId equal to the identifier of CTile. As a result, the CTile identifier is not required in the slice segment header. Since it as a fixed bit length, the handling of CTile identifier remains simple when shuffling frame portions of a video stream.

The encoder signals the frame portion arrangement in one of the parameter sets for example the VPS. The VPS indicates the decoding location of each spatial region layer by associating the unique identifier of the spatial region layer with a decoding location with a syntax that may correspond to the syntax described in the previous embodiments.

The encoder also describes the dependencies between the different layers of the video stream. A decoder then determines the spatial region layer coded independently of the other layers through the analysis of the dependencies between the layers described in the parameter sets NAL units.

The encoder compresses a subset of the spatial region layers as a CTile, independently of the other spatial region layers. When one spatial region layers depends of another spatial region layer (slices in this layer have ctile_flag set to false) in a previous frame (i.e. with the same CTile identifier), the encoder adds the reference frames from this dependent layer into the decoded picture buffer of the current layer. An upsampling or downsampling filter is applied when the sizes of the two layers differ such that the reference frames have a size equal to the size of the current layer.

According to an embodiment, LayerId can also be used to infer the ctile_flag: when LayerId is zero, the NAL unit is belonging to a HEVC-type tile. When LayerId is not zero, the NAL unit belongs to a CTile with a CTile identifier equal to LayerId. Alternatively one bit of LayerId is reserved to signal ctile_flag. The advantage of using LayerId to transport the CTile identifier, is that it greatly reduces the complexity of parsing the bitstream for extraction of a CTile.

In another embodiment, the spatial region scalability is defined similarly to temporal scalability in HEVC i.e. different layer identifiers identify temporal, spatial region from other scalability layers (e.g. SNR, resolution, multi-view). Indeed, the advantage of this approach is that it is possible to use both spatial region scalability and SNR or resolution scalability layers.

A NAL unit header 1502 is extended with a random access identifier (RAID) which now indicates the frame portion identifier. The LayerId semantics remains the same as for HEVC i.e. it indicates a multi-view, SNR or resolution scalability layer.

The encoder specifies the location of each spatial region layer by associating its RAID value with decoding location in one of the parameter sets for example the VPS. Each NAL units (including the SPS, PPS and VCL NAL units) that encode the spatial region has a RAID equal to the frame portion identifier (CTile (set) identifier) corresponding to the spatial region.

As a result, the merging process described above (which consist in extracting CTiles from a set of video bitstreams and combine them into a new video bitstream) extracts the CTile identifiers of spatial region layer to merge from the frame portion arrangement related to the video streams to combine. Then, it extracts all the NAL units with a RAID value equal to the extracted set of identifiers.

To limit the risk of collision of identifiers when combining two video sequences, the encoder sets the RAID value with a random value. This includes cases when the video sequence contains a single frame portion.

According to an embodiment, RAID specifies whether the spatial region is a CTile (it replaces the signalling of the ctile_flag in the slice segment headers): when RAID is zero, the NAL unit is belonging to a HEVC-type tile. When RAID is not zero, the NAL unit belongs to a CTile with identifier equal to RAID. Alternatively, one bit of RAID is reserved to signal ctile_flag. In alternative embodiments, the RAID identifier is 16, or 24 bits in order to allow more CTiles.

According to an embodiment, a sequence of CTiles is considered as an independent bitstream. For instance in some embodiments, the sequence order of CTiles with the same identifier may be different from the sequence order of CTiles with another identifier (i.e. the GOP structure can be different between two CTiles). Thus, two CTiles in the same frame may have different NAL unit Type or TID.

In another embodiment, XPS comprises additional information describing some dependencies between CTiles, in a way that the decoder is able to handle them without any errors. We have seen that the independence of CTiles may be contemplated at the level of a set of CTiles instead of at the level of each CTiles. In this configuration, some CTiles within a CTile set may have some dependencies.

Figures 16A, 16B:
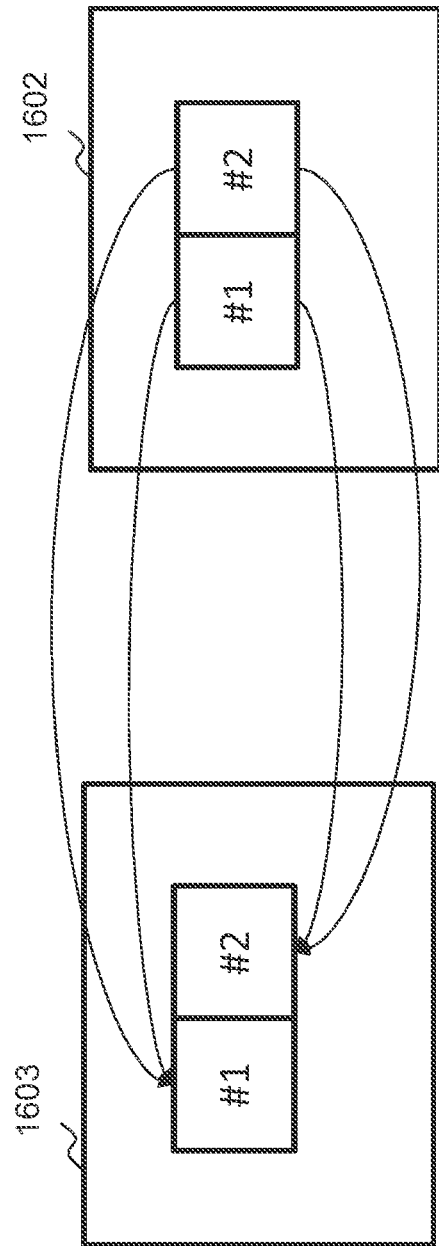
FIG. 16a illustrates an XPS comprising a dependency list per CTile.
FIG. 16b illustrates a first example of CTile dependencies.

For instance, FIG. 16a illustrates an XPS comprising a dependency list per CTile. The dependency list provides the CTiles identifiers 1601 on which depends the given CTile with identifier 1600. When a given CTile is indicated as having dependencies on another CTile, it means that the given CTile cannot be extracted without the other CTile.

FIG. 16b illustrates a first example of CTile dependencies. The CTile #1 in a current frame 1602 uses samples values from CTile #2 when performing motion compensation from a previous encoded frame 1603; and the CTile #2 uses samples values from CTile #1. In such example, the XPS indicates that CTile with identifier #1 has dependencies on CTile with identifier #2, and that CTile with identifier #2 has dependencies on CTile with identifier #1. The signalling of these mutual dependencies is an alternative to signalling CTiles set.

Figure 16C:
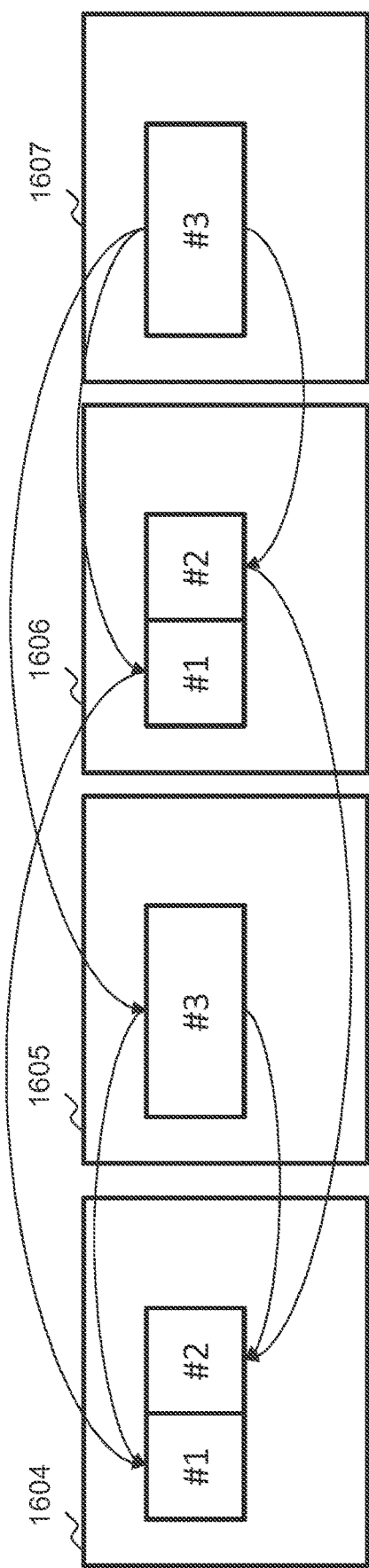
FIG. 16c illustrates a second example of CTile dependencies.

FIG. 16c illustrates a second example of CTile dependencies. In such example, The CTile #3, present in frames 1605 and 1607 as dependencies on CTiles #1 and #2 in frames 1604 and 1607. In such example, the CTile #3 cannot be extracted without also extracting CTiles #1 and #2. But CTiles #1 and #2 have no dependencies and could be extracted alone. According to embodiments, this scenario can be applied to facilitate the extraction of CTiles at various frame rates, for instance if frames 1604 to 1606 are temporally ordered. Alternatively, it can be used in scalable coding for instance if frame 1605 is a refinement layer of the frame 1604, and frame 1607 is a refinement layer if the frame 1606, to facilitate the extraction of CTiles for different quality layers.

According to some embodiments, the CTile may change spatial positon or size between successive frames.

According to embodiments, a 'Tile Parameter Set', TilePS, is also introduced. A TPS allow to update CTiles parameters of a subset of CTiles (only the one moving and/or changing size), it contains for instance a 'num_updated_tiles' value, then it associate the tile identifier to its new properties for the 'num_updated_tiles' modified CTiles.

Classically, motion vectors give the position of a predictor block in a reference image relatively to a block collocated with the block to encode. For a given block to encode, the first step is to identify in the reference image the collocated block. The collocated block is defined as the block in the reference image having the same position, meaning the same origin (top left position) and the same size as the block to encode. Then, the motion vector is applied to the origin of the collocated block to determine the origin of the predictor block.

When considering CTiles, the determination of the collocated block is adapted to consider the block having the same position within the CTile and not anymore within the frame. When a CTile has been shuffled, it means that its position in the frame has been modified in the frame at decoding relatively to its position within the frame at encoding. However, considering that prediction is restrained within the CTile to ensure independent decoding, the right predictor block can still be determined by applying the motion vector to the block collocated to the encoding block within the CTile. This is true as long as the CTile keeps its size and position from frame to frame. A difficulty arises when the CTile changes its position in the frame and/or its size between two successive frames. In this case, the encoder and the decoder agrees on a way of determining the position of the collocated block in the reference frame to which the motion vector is to be applied to correctly determine the predictor block.

According to an embodiment where a CTile may change position or size between successively encoded frames, the relative position of a CTile in two successive frames may not be the same in two different bitstreams. FIG. 17 provides an example of such embodiments, where a first bitstream contains frames of video surveillance 1700. In a first frame 1701 there are several sptail frame portions including a CTile 1702 for a moving region of interest with a given ctile_id. In another frame 1703, the CTile with the given ctile_id has moved and has changed size 1704. A second bitstream contains a video 1705 generated by assembling CTiles extracted from 1700, with generated CTiles containing a uniform color (black for instance). In a first frame 1706 the CTile with the given ctile_id 1702 has been extracted from the first bitstream and put in the center of the frame 1707. In another frame 1708 the CTile with the given ctile_id 1704 has been extracted from the first bitstream and put in the center of the frame 1709. In the first bitstream, the CTile 1704 uses INTER prediction with temporal reference to the CTile 1701. Thus in the generated video 1705, the CTile 1709 uses INTER prediction with temporal reference to the CTile 1707. Relative spatial position between CTile 1702 and 1704 is not the same as between 1707 and 1709. So in order to be properly decoded whatever the decoding relative position is, when INTER prediction modes are used, the encoded motion vectors do not take into account the CTile position change (i.e. the relative spatial position between successive frames).

According to a first alternative, the motion vectors are computed as if a predetermined reference point of the CTile in the two successively encoded frames are at the same spatial position (top-left, top-right, bottom-left, bottom-right, middle-top, middle-bottom, middle-left, middle-right or center for instance). Thus, the encoded motion vector would correspond to the motion vector for the block, in the frame referential, minus the motion vector between the reference point of the CTile, in the frame referential also: hence a motion vector in a referential relative to the CTile is obtained. It results that the CTile is then decodable independently of later spatial alteration.

FIG. 17b illustrates that for a CTile 1710 encoded in a frame 1711 using a reference CTile 1712 with the same ctile_id in a reference frame 1713. The block 1714 is encoded using a motion vector 1715 corresponding to the difference between the motion vector in the frame 1716 and the motion vector between the predetermined reference points 1717 (in that example the predetermined reference points is the top-left corner of the CTile). The FIG. 17b also illustrates that, even if the relative temporal decoding position of the CTile is not the same as the encoding one, the encoded vector 1715 is still valid when decoding the block 1718 by adding it to the motion vector between the predetermined reference points in the decoded frame 1719 in order to obtain the motion vector in the decoded frame 1720.

According to a second alternative, the motion vectors are computed as if a given point of the CTile is at the same spatial position in the two successively encoded frames. The given point is signalled in the CTile encoded data as the index in a list of predetermined points (top-left, top-right, bottom-left, bottom-right, middle-top, middle-bottom, middle-left, middle-right or center for instance).

According to a third alternative, a fixed point (or alternatively a signalled point) is considered and a motion vector is encoded in the CTile encoded data. The motion vector encoded in the CTile encoded data provides a motion vector that is added to each one of the INTER motion vectors associated to temporal predictions in the CTiles when considering that the fixed (or signalled) point of the CTile in the two successively encoded frames are at the same spatial position. It allows an encoder to reduce the coding cost of the motion vectors. For instance, an encoder may choose the average motion vector of the motion compensated blocs of a CTile. Looking at FIG. 17b for instance, this average motion vector would be subtracted to the vector 1715. The result of the subtraction is considered as the motion vector to be encoded. An alternative, which is equivalent in term of result is to provide a (sub-) pixel position of the reference point in the encoded CTile, instead of (or in addition to) a fixed point or a fixed point index and a motion vector.

According to a fourth alternative a fixed point (or alternatively a signalled point) is considered. Parameters of a motion vector field are encoded in the CTile encoded data. The motion field allows to determine a motion vector that is added to each one of the INTER motion vectors associated to temporal predictions in the CTiles when considering that the fixed (or signalled) point of the CTile in the two successively encoded frames are at the same spatial position. For instance an encoder may estimate the motion vectors of the blocks in the CTile and may estimate the motion vector field that minimize their prediction in order to minimize their residual and so reduce the cost of their encoding. Each motion compensation vector of an INTER encoded block is then the result of the subtraction of the motion vector computed from the motion vector field parameters to the motion compensation vector (1715 for instance).

According to embodiments, INTER prediction modes may refer to more than one previously encoded reference frame. In that embodiment, the previously described embodiments may be extended to consider the fixed (or signalled point) of the CTile are aligned in the encoded frame and every reference frames.

In embodiments where motion vector or motion vector field are signalled, the extension to multiple frame can be done in two alternative ways:
either by signalling as many motion vectors (or motion vector fields parameters) as the number of referenced frames, or
by signalling only one motion vector (or motion vector field) 'x' that is used to derive one motion vector (or motion vector field) for each reference frame according to its temporal difference to the encoded frame.

For instance a linear scaling is used: if the temporal position of the reference frame is 't−s' (where 's' is a constant temporal sampling period between frames, and 't' is a time) and the temporal position of the encoded frame is 't', the used scaling factor is '(t)/s−(t−s)/s=1' but if a temporal position of a reference frame is 't+2s', the used scaling factor is '(t)/s−(t+2s)/s=−2'. The scaling factor is applied to compute the motion vector for each reference frame. For instance, looking at FIG. 17b, in the case where the reference frame 1713 is 't+2s', the motion vector 1715 is subtracted −2*'x'. The result 'y' of the subtraction is the value of the motion vector that is encoded (for instance if the encoding mode is the inter prediction mode of HEVC, 'y' is the motion vector that is predicted using a motion vector predictor index). In other words, at the decoder side, the motion vector 'y' is decoded for the motion compensated block, then it is added −2*'x' to obtain the vector 1715. The motion vector 1717 is further added to obtain the motion vector at the frame level.

Figure 12:
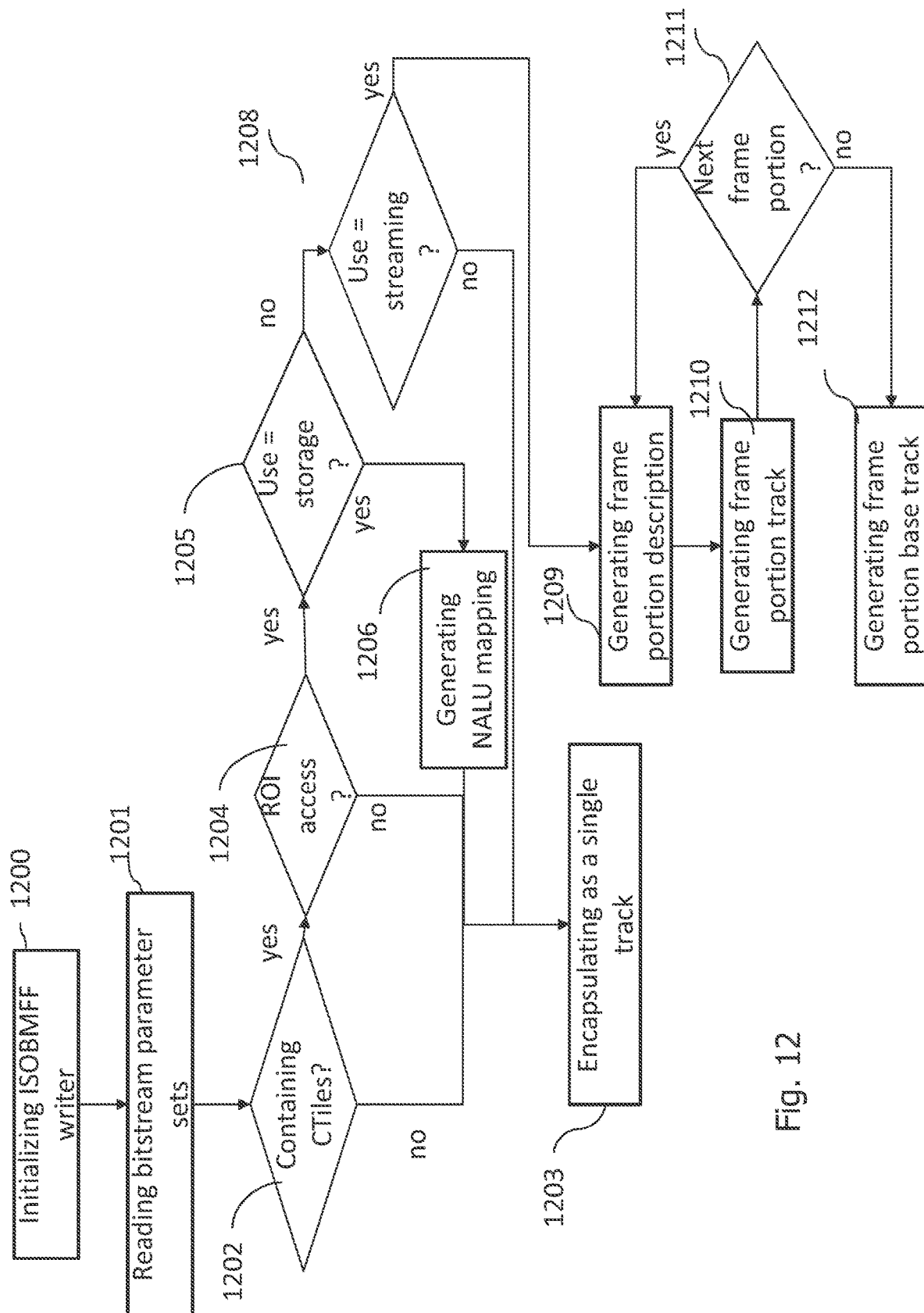
FIG. 12 provides details on the encapsulation steps.

FIG. 12 provides details on the encapsulation step 906 or 1105 at the encoder side, when the bitstream is encapsulating into a higher-level description format, as mentioned in the previous description.

In a preferred embodiment, the video bitstream with CTiles is encapsulated according to the ISO Base Media File Format (ISOBMFF, ISO/IEC 14496-12 and 14496-15). In the following description related to FIG. 12, the word "sample" which corresponds to a "frame", i.e. the set of NAL units from the video bitstream corresponding to a coded picture, as defined for ISOBMFF.

The encapsulation is handled by an ISOBMFF or mp4 writer. This writer contains a parser of NAL unit headers. It is able to extract NALU types, identifiers and corresponding compressed data. Typically, the extracted NALU data are placed in a media data container of the encapsulated file: the 'mdat' box. The metadata for the description of the NAL units are placed in a structured hierarchy of boxes under a main 'moov' box. One video bitstream in encapsulated into a video track, described by a 'trak' box with its sub boxes.

For partitioned video frames, there are different possible encapsulations depending on the foreseen use of the video. This use can be hard-coded in the mp4 writer application or can be provided as input parameter by one user or another program, for example in an initializing step 1200. In an embodiment, it may be convenient to encapsulate one frame portion or a given set of frame portions into one video track, thus leading to multi-track encapsulation.

Once the initialization of the ISOBMFF writer has been done, the encoder starts parsing the video bitstream in a step 1201 by reading the NALU types, in particular the ones corresponding to parameter sets (XPS). As already explained above, the parameter sets are specific NAL units providing high-level and general information on the coding configuration of the video bitstream like.

From the parsing of these parameter sets, the mp4 writer can determine in a test 1202 whether the video bitstream contains frame portions (ex: presence of a TPS or specific partitioning configuration in one of the parameter sets). If frame portions are present, the mp4 writer determines in the same test 1202 whether these are "constrained tiles", i.e. CTiles. If the bitstream does not contain frame portions or does not contain CTiles, the test 1202 is false and the video bitstream is encapsulated as one video track in a step 1203.

The TPS (Tiling Parameter Set) is considered as one NALU for parameter set information and can either be embedded in the metadata providing decoder configuration or setup information like the DecoderConfigurationRecord boxes that can be found in one of the boxes dedicated to sample description like for example the 'stsd' box, typically in some codec-specific sample entry.

Alternatively, according to an embodiment of the invention, the TPS can be processed as the NAL unit for video data (VCL NALU) and stored as one sample data in the 'mdat' box. It may also be present in both sample entry and sample data. If the frame portion configuration changes along the video sequence, it is more convenient to store it at the sample level (samples data) than at the sample description level (sample entry).

When the change in the frame portion partitioning configuration requires to reset the decoder at the receiving side, then the ISOBMFF writer preferably stores the TPS and CTiles related information from the video bitstream in a sample entry. This decoder reset allows the device receiving or consuming the file to take the new partitioning configuration into account. The new partitioning configuration may for example contain indication of coding tools (i.e. profiles) to support or amount of data to process (i.e. levels). Depending on the profile and level values or other parameters for the partitioning configuration, the device may support or not the new partitioning configuration. When not supported, the device may adapt the transmission or may select alternative versions of the video when available. When the new configuration is supported, the device continues decoding and rendering of the file.

When a spatial access to a ROI is required, branch "yes" after test 1204, the ISOBMFF writer may have a different encapsulation strategy depending on the use case. The spatial access means for example an ROI or partition-based display (i.e. extraction and decoding of only the part of the data corresponding to the ROI or portion or frame portion or set of frame portions) or ROI or portion-based streaming (i.e. transmitting only the part of the data and metadata corresponding to the ROI or the portion or set of frame portions). If the foreseen use case is storage for local display, corresponding to a test 1205 being true (branch "yes"), then it may be convenient to store the partitioned video bitstream in one track but including a NALU mapping to the ROI or frame portion or set of frame portions for which a spatial access is required. The NALU mapping is generated at a step 1206. It consists, for the ISOBMFF writer, for each NALU of the video bitstream in listing the NAL units pertaining to a given CTile or having the same random access identifier (RAID reference 1502 in FIG. 15) (i.e. corresponding to a selectable and decodable frame portion or spatial region). To be able to perform the listing, the NALU parser module of the ISOBMFF writer checks the value of the identifier assigned to the ROI or frame portion or set of frame portions for which a spatial access is required in the step 903, depending on the embodiment for the bitstream generation.

If the bitstream does not contain in the NALU header specific identifier for the ROI or frame portion or set of frame portions for which a spatial access is required, then the ISOBMFF writer requires a slice header parser to get the value of an identifier of CTile assigned in 903, for example ctile_unique_identifier, referenced 1301 in FIG. 13a).

Then, a NALUMapEntry structure 'nalm' is created in a step 1206 as a box under the 'trak' box hierarchy to store the list of NALU and their mapping to frame portions or set of frame portions. For each frame portion or set of frame portions, a SampleGroupDescriptionBox of type 'trif' provides, for each frame portion or set of frame portions, a description of the frame portion or set of frame portions, for example providing the parameters of the TileRegionGroupEntry from ISO/IEC 14496-15. The group_ID value of the frame portion descriptor 'trif' is set to the value of the identifier of the CTile to encapsulate.

Then all the frame portion or set of frame portions data are encapsulated as a single track in the step 1203. When the use case is streaming, corresponding to a test 1208 being true (branch "yes"), then it may be convenient to split each frame portion or set of frame portions corresponding to a spatial access level in the video into a dedicated track, when the test 1208 is true, a single track encapsulation is done.

For streaming use case, for each frame portion or set of frame portions, a frame portion description is generated in a step 1209 as for the NALU mapping. The number of frame portions or of set of frame portions can be determined by parsing the TPS. A 'trif' sample group is used, even a default sample group can be used since there is one frame portion or one set of frame portions per frame portion track (track for encapsulating data related to one frame portion or set of frame portions) generated in a step 1210. Then all the samples map to same sample group description which is a frame portion descriptor 'trif' according to ISO/IEC 14496-15. The group_ID value of the frame portion descriptor 'trif' is set to the value of the identifier of the CTile (or RAID if any) to encapsulate.

Then, each frame portion or set of frame portions is inserted in its own track, a frame portion track, in step 1210. The frame portion track comprises specific sample entries indicating that the samples are actually spatial parts of a video and referencing a frame portion base track created in step 1212 when no more frame portion or frame portion set remains to encapsulate, test 1211. This frame portion base track contains the specific NAL units corresponding to parameter sets, including the Tiling Parameter Set (TPS). The frame portion base track references each frame portion tracks in order with a specific track reference type to allow implicit reconstruction of any selection of frame portion or set of frame portions. The step 1212 can be replaced by a composite track where NAL units called extractors provide explicit reconstruction from one or more frame portion tracks.

Extractors then allows for each sample of the composite track any arrangement of frame portions or set of frame portions, even different than the original one by simply having an extractor pointing to a given identifier of a frame portion or set of frame portions, typically referencing the identifier of the corresponding CTile (or RAID if any).

When using a composite track in the step 1212, the frame portion tracks at step 1210 may actually be decodable frame portion tracks, meaning that each contains the frame portion description (generated in 1209) and the parameter sets. The presence of the TPS in each frame portion track is optional since the extractor may recombine differently. The sample description may then indicate sample entry compliant to the codec in use: for example 'hvc1' or 'hvc2' if HEVC is in use or 'avc1' or 'avc2' if AVC (Advanced Video Coding) is in use, or any reserved four character coder unambiguously identifying the video coder in use.

Figure 18:
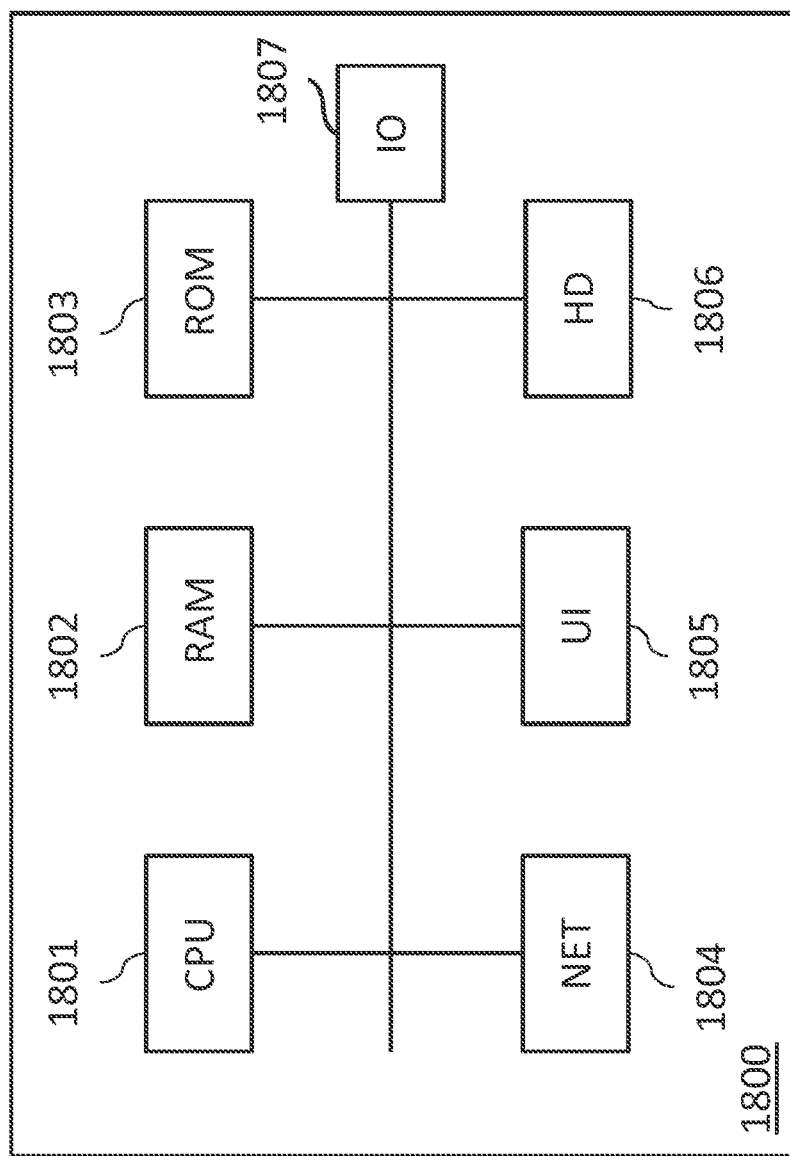
FIG. 18 is a schematic block diagram of a computing device for implementation of one or more embodiments of the invention.

FIG. 18 is a schematic block diagram of a computing device 1800 for implementation of one or more embodiments of the invention. The computing device 1800 may be a device such as a micro-computer, a workstation or a light portable device. The computing device 1800 comprises a communication bus connected to:

a central processing unit 1801, such as a microprocessor, denoted CPU;

a random access memory 1802, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;

a read only memory 1803, denoted ROM, for storing computer programs for implementing embodiments of the invention;

a network interface 1804 is typically connected to a communication network over which digital data to be processed are transmitted or received. The network interface 1804 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1801;

a user interface 1805 may be used for receiving inputs from a user or to display information to a user;

a hard disk 1806 denoted HD may be provided as a mass storage device;

an I/O module 1807 may be used for receiving/sending data from/to external devices such as a video source or display.

The executable code may be stored either in read only memory 1803, on the hard disk 1806 or on a removable digital medium such as for example a disk. According to a variant, the executable code of the programs can be received by means of a communication network, via the network interface 1804, in order to be stored in one of the storage means of the communication device 1800, such as the hard disk 1806, before being executed.

The central processing unit 1801 is adapted to control and direct the execution of the instructions or portions of software code of the program or programs according to embodiments of the invention, which instructions are stored in one of the aforementioned storage means. After powering on, the CPU 1801 is capable of executing instructions from main RAM memory 1802 relating to a software application after those instructions have been loaded from the program ROM 1803 or the hard-disc (HD) 1806 for example. Such a software application, when executed by the CPU 1801, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding a frame into a bitstream, the frame being spatially divided into rectangular regions each of which is capable of comprising at least one slice, the method comprising:

encoding a rectangular region in the frame;

signalling an identifier of each one of the rectangular regions in the frame, signalling first information corresponding to a number of the rectangular regions in the frame, signalling second information of a position of the rectangular region within the frame, and signalling a flag related to loop filtering across boundaries of at least one of the rectangular regions in the frame, wherein inter prediction is capable of being used in the rectangular region, wherein the identifier of each one of the rectangular regions in the frame is signalled with the same number of bits in the bitstream, wherein all of the identifier, the first information, and the second information are signalled in a single parameter set in the bitstream, and wherein third information, different from the first information corresponding to the number of the rectangular regions in the frame, of the number of bits used to represent the identifier of each one of the rectangular regions in the frame is further signalled in the bitstream in a state where a different identifier is assigned to each one of the rectangular regions in the frame, the number of bits being a variable number.

2. A method of decoding video data comprising a frame from a bitstream, the frame being spatially divided into rectangular regions each of which is capable of comprising at least one slice, the method comprising:

obtaining, from a single parameter set in the bitstream, an identifier of each one of the rectangular regions in the frame, first information corresponding to a number of the rectangular regions in the frame, and second information of a position of a rectangular region in the frame, wherein inter prediction is capable of being used in the rectangular region, wherein the identifier of each one of the rectangular regions in the frame is signalled with the same number of bits in the bitstream, wherein all of the identifier, the first information, and the second information to be obtained are signalled in the single parameter set in the bitstream, and a flag related to loop filtering across boundaries of the rectangular region is signalled in the bitstream, and wherein third information, different from the first information corresponding to the number of the rectangular regions in the frame, of the number of bits used to represent the identifier of each one of the rectangular regions in the frame is signalled in the bitstream in a state where a different identifier is assigned to each one of the rectangular regions in the frame, the number of bits being a variable number;

determining the position of the rectangular region in the frame based on the second information; and decoding the rectangular region from the bitstream.

3. A device for encoding video data comprising a frame into a bitstream, the frame being spatially divided into rectangular regions each of which is capable of comprising at least one slice, the device comprising at least one processor configured for:

encoding a rectangular region in the frame;

signalling an identifier for each one of the rectangular regions in the frame, signalling first information corresponding to a number of the rectangular regions in the frame, signalling second information of a position of the rectangular region within the frame, and signalling a flag related to loop filtering across boundaries of at least one of the rectangular regions in the frame, wherein inter prediction is capable of being used in the rectangular region, wherein the identifier of each one of the rectangular regions in the frame is signalled with the same number of bits in the bitstream, wherein all of the identifier, the first information, and the second information are signalled into a single parameter set in the bitstream, and wherein third information, different from the first information corresponding to the number of the rectangular regions in the frame, of the number of bits used to represent the identifier of each one of the rectangular regions in the frame is further signalled in the bitstream in a state where a different identifier is assigned to each one of the rectangular regions in the frame, the number of bits being a variable number.

4. A device for decoding video data comprising a frame from a bitstream, the frame being spatially divided into rectangular regions each of which is capable of comprising at least one slice, the device comprising at least one processor configured for:

obtaining, from a single parameter set in the bitstream, an identifier of each one of the rectangular regions in the frame, first information corresponding to a number of the rectangular regions in the frame, and second information of a position of a rectangular region in the frame, wherein inter prediction is capable of being used in the rectangular region, wherein the identifier of each one of the rectangular regions in the frame is signalled with the same number of bits in the bitstream, wherein all of the identifier, the first information, and the second information to be obtained are signalled in the single parameter set in the bitstream, and a flag related to loop filtering across boundaries of the rectangular region is signalled in the bitstream, and wherein third information, different from the first information corresponding to the number of the rectangular regions in the frame, of the number of bits used to represent the identifier of each one of the rectangular regions in the frame is signalled in the bitstream in a state where a different identifier is assigned to each one of the rectangular regions in the frame, the number of bits being a variable number;

determining the position of the rectangular region in the frame based on the second information; and decoding the rectangular region from the bitstream.

5. A non-transitory computer-readable medium comprising processor executable code for a programmable apparatus, comprising a sequence of instructions for implementing a method of encoding video data comprising a frame into a bitstream, the frame being spatially divided into rectangular regions each of which is capable of comprising at least one slice, the method comprising:

encoding a rectangular region in the frame;

signalling an identifier for each one of the rectangular regions in the frame, signalling first information corresponding to a number of the rectangular regions in the frame, signalling second information of a position of the rectangular region within the frame, and signalling a flag related to loop filtering across boundaries of at least one of the rectangular regions in the frame, wherein inter prediction is capable of being used in the rectangular region, wherein the identifier of each one of the rectangular regions in the frame is signalled with the same number of bits in the bitstream, wherein all of the identifier, the first information, and the second information are signalled in a single parameter set in the bitstream, and wherein third information, different from the first information corresponding to the number of the rectangular regions in the frame, of the number of bits used to represent the identifier of each one of the rectangular regions in the frame is further signalled in the bitstream in a state where a different identifier is assigned to each one of the rectangular regions in the frame, the number of bits being a variable number.

6. A non-transitory computer-readable storage medium comprising processor executable code for a programmable apparatus, comprising a sequence of instructions for implementing a method of decoding video data comprising a frame from a bitstream, the frame being spatially divided into rectangular regions each of which is capable of comprising at least one slice, the method comprising:

obtaining, from a single parameter set in the bitstream, an identifier of each one of the rectangular regions in the frame, first information corresponding to a number of the rectangular regions in the frame, and second information of a position of a rectangular region in the frame, wherein inter prediction is capable of being used in the rectangular region, wherein the identifier of each one of the rectangular regions in the frame is signalled with the same number of bits in the bitstream, wherein all of the identifier, the first information and the second information to be obtained are signalled in the single parameter set in the bitstream, and a flag related to loop filtering across boundaries of the rectangular region is signalled in the bitstream, and wherein third information, different from the first information corresponding to the number of the rectangular regions in the frame, of the number of bits used to represent the identifier of each one of the rectangular regions in the frame is signalled in the bitstream in a state where a different identifier is assigned to each one of the rectangular regions in the frame, the number of bits being a variable number;

determining the position of the rectangular region in the frame based on the second information; and decoding the rectangular region from the bitstream.

* * * * *